(12) United States Patent
Burgess

(10) Patent No.: US 11,262,487 B1
(45) Date of Patent: Mar. 1, 2022

(54) DISPLAY DEVICE INCLUDING LENS ARRAY WITH INDEPENDENTLY OPERABLE ARRAY SECTIONS

(71) Applicant: Facebook Technologies, LLC, Menlo Park, CA (US)

(72) Inventor: Kirk Erik Burgess, Newark, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 192 days.

(21) Appl. No.: 16/789,394

(22) Filed: Feb. 12, 2020

(51) Int. Cl.
| | |
|---|---|
| *G02B 1/06* | (2006.01) |
| *G02B 3/14* | (2006.01) |
| *G06F 1/16* | (2006.01) |
| *G02F 1/166* | (2019.01) |
| *G02B 27/01* | (2006.01) |
| *G02B 3/00* | (2006.01) |

(52) U.S. Cl.
CPC ............ *G02B 3/14* (2013.01); *G02B 3/0075* (2013.01); *G02B 27/0172* (2013.01); *G02F 1/166* (2019.01); *G06F 1/1609* (2013.01); *G02B 2027/0178* (2013.01)

(58) Field of Classification Search
CPC .... G02B 3/14; G02B 27/0172; G02B 3/0075; G02B 2027/0178; G06F 1/1609; G02F 1/166
USPC ......................................................... 359/665
See application file for complete search history.

(56) References Cited

U.S. PATENT DOCUMENTS

| | | | |
|---|---|---|---|
| 2005/0030438 A1* | 2/2005 | Nishioka ............ | G02B 26/0825 349/21 |
| 2011/0149406 A1 | 6/2011 | Tsuji et al. | |

OTHER PUBLICATIONS

Niklaus et al., "Array of lenses with individually tunable focal-length based on transparent ion-implanted EAPs", Electroactive Polymer Actuators and Devices (EAPAD), edited by Yoseph Bar-Cohen, Proc. of SPIE, vol. 7642, Article 76422K, Apr. 22, 2010, pp. 1-12.
Murade et al., "High speed adaptive liquid microlens array", Optics Express, vol. 20, No. 16, Jul. 24, 2012, pp. 18180-18187.
Shian et al., "Tunable lenses using transparent dielectric elastomer actuators", Optics Express, vol. 21, No. 7, Apr. 2, 2013, pp. 8669-8676.
Wei et al., "Electroactive liquid lens driven by an annular membrane", Optics Letters, vol. 39, No. 5, Feb. 27, 2014, pp. 1318-1321.
(Continued)

*Primary Examiner* — James C. Jones
(74) *Attorney, Agent, or Firm* — FisherBroyles, LLP

(57) ABSTRACT

The disclosed liquid lens array may include a plurality of independently operable array sections, each of which may include (1) a transparent base layer, (2) an aperture plate overlapping the transparent base layer, the aperture plate defining a plurality of apertures extending through the aperture plate between an inner surface of the aperture plate facing the transparent base layer and an outer surface of the aperture plate, and (3) a liquid reservoir disposed between the base layer and the aperture plate. The liquid lens array may also include driving circuit for operating at least one array section of the plurality of array sections to change liquid volumes extending from the liquid reservoir at least partially through the apertures defined in the aperture plate of the at least one array section. Various other methods, systems, and devices are also disclosed.

20 Claims, 15 Drawing Sheets

(56) References Cited

OTHER PUBLICATIONS

Koukourakis et al., "Axial scanning in confocal microscopy employing adaptive lenses (CAL)", Optics Express, vol. 22, No. 5, Mar. 6, 2014, pp. 6025-6039.

Choi et al., "Opto-mechanical analysis of nonlinear elastomer membrane deformation under hydraulic pressure for variable-focus liquid-filled microlenses", Optics Express, vol. 22, No. 5, Mar. 7, 2014, pp. 6133-6146.

Zhu et al., "Mechanics of dielectric elastomers: materials, structures, and devices", Journal of Zhejiang University—Science A (Applied Physics & Engineering), Review, vol. 17, No. 1, Jan. 9, 2016, pp. 1-21.

* cited by examiner

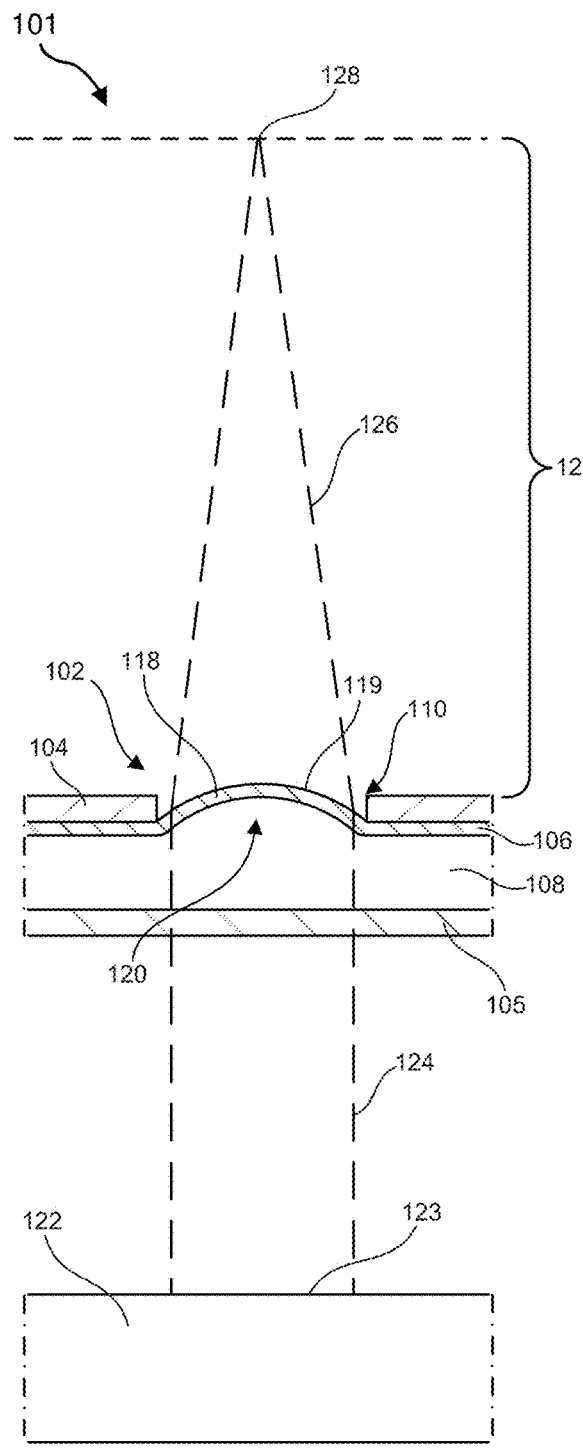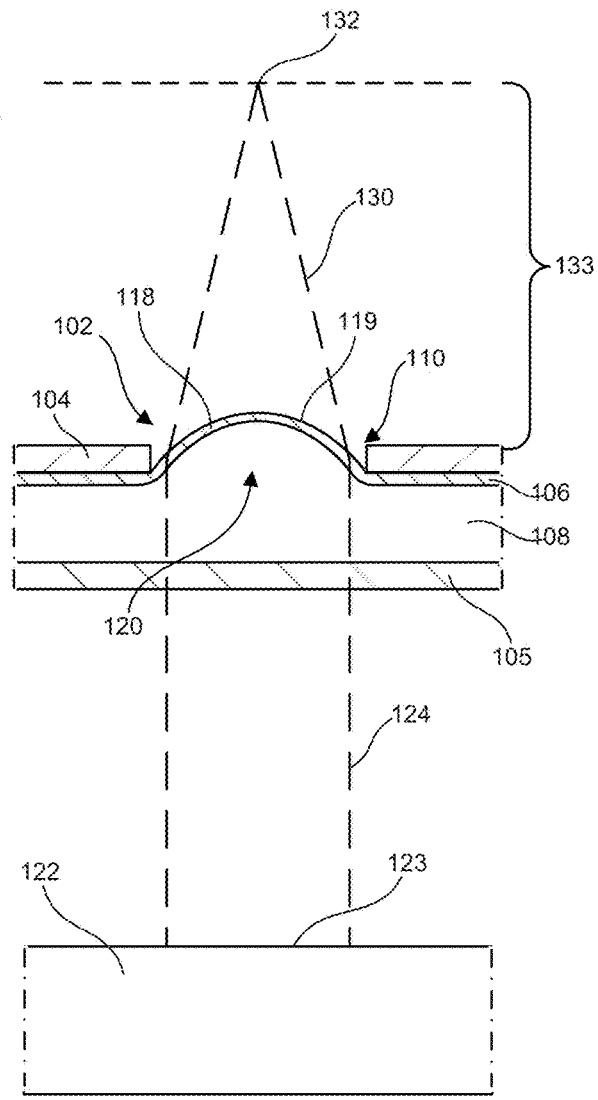
FIG. 3A  FIG. 3B

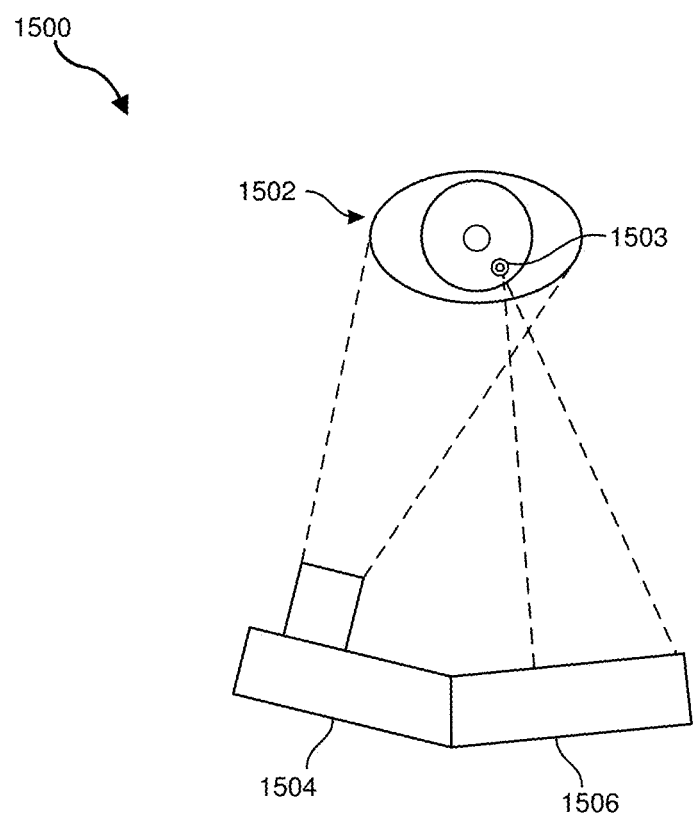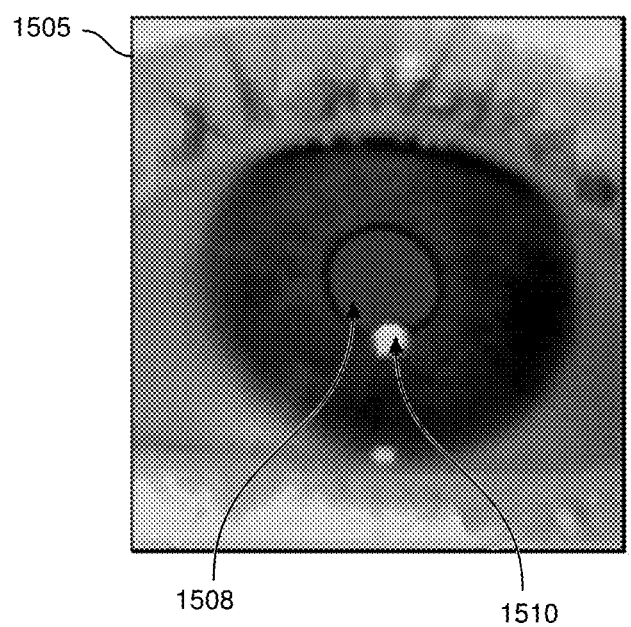
FIG. 15

DISPLAY DEVICE INCLUDING LENS ARRAY WITH INDEPENDENTLY OPERABLE ARRAY SECTIONS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 3A is a cross-sectional side view of a portion of an exemplary display device illustrating light from a light-emitting array focused at a first focal point by a liquid lens of a lens array section in accordance with embodiments of this disclosure.

FIG. 3B is a cross-sectional side view of the portion of the display device of FIG. 3A with the liquid lens in a different focus state such that light from the light-emitting array is focused by the liquid lens at a second focal point in accordance with embodiments of this disclosure.

FIG. 15 is a more detailed illustration of various aspects of the eye-tracking subsystem illustrated in FIG. 14.

Figure 1:
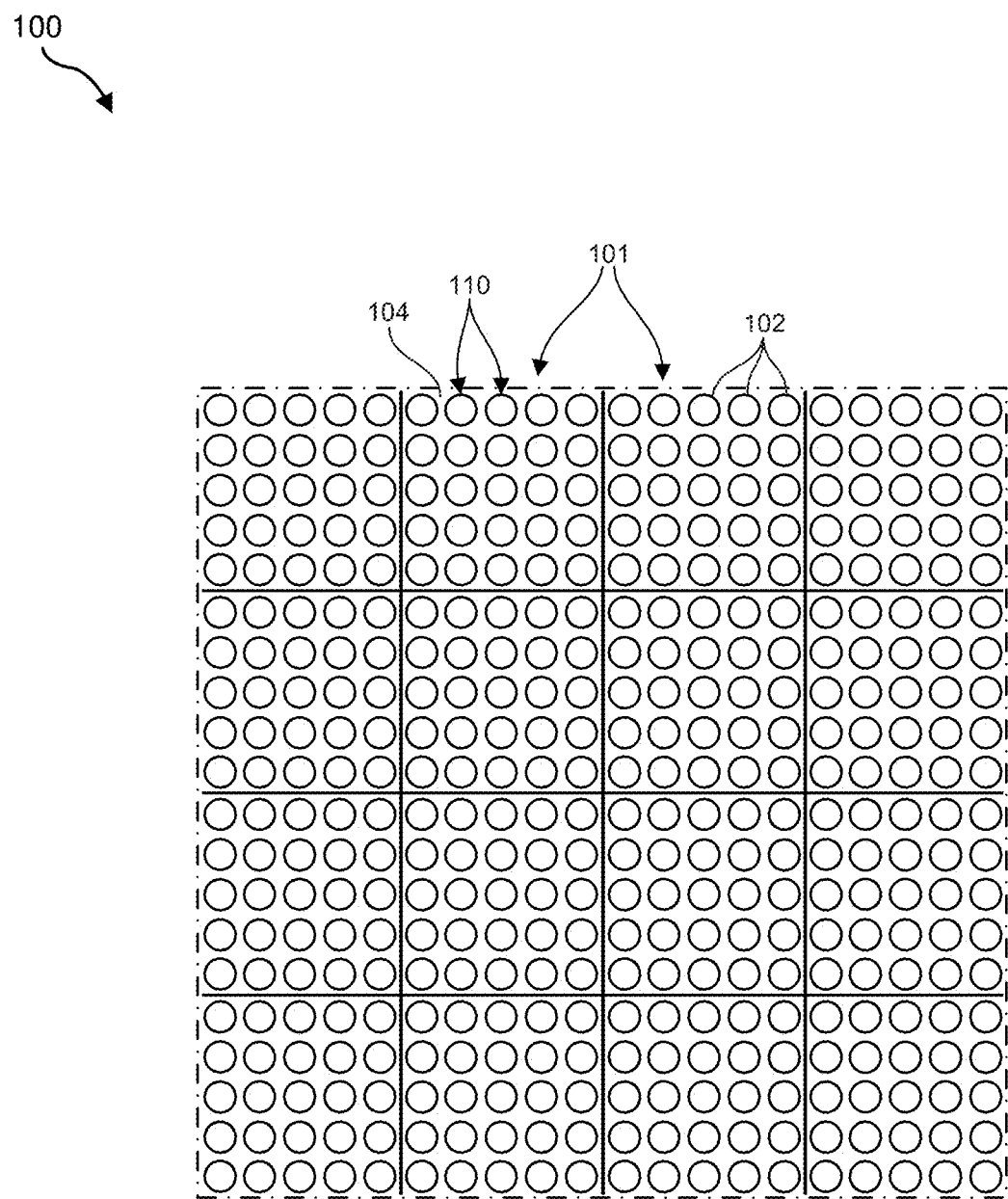
FIG. 1 is a front view of a portion of an exemplary liquid lens array that includes a plurality of array sections that each have multiple liquid lenses in accordance with embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Artificial-reality systems are widely gaining in popularity for use in a growing number of activities. For example, artificial-reality systems (including augmented-reality, mixed-reality, and virtual-reality devices, such as headsets) may enable users to experience events, such as interactions with people in computer-generated simulations of three-dimensional worlds or viewing images superimposed on real-world views. Such devices and headsets are also commonly used for purposes other than recreation. For example, governments may use such devices for military training, medical professionals may use the devices to simulate surgery, and engineers may use such devices as design visualization aids.

These systems may enable users to have immersive or semi-immersive experiences, generating separate image streams respectively shown on left- and right-side displays in such a way that alignment of the displayed images results in ocular vergence (i.e., simultaneous movement of both eyes in opposite directions) toward a virtual location. However, in what's known as vergence-accommodation conflict, displays typically project light from a two-dimensional or roughly two-dimensional display plane that is located at a fixed distance from the user's eyes, resulting in mismatching cues between the distance of a virtual three-dimensional object and the focusing distance required to bring that object into focus. When both eyes are used (stereoscopically), binocular disparity is the main visual cue for depth. The two eyes look at an object from slightly different angles, so they get slightly different views of the object. This difference in views is the binocular disparity (imperfect match) between the two views. The human visual system normally fuses these two images into a single perception and converts the disparity between the two images into a perception of depth. The closer an object is, the larger the disparity (error in matching) between the images it produces on the two retinas.

In conventional artificial-reality devices, light emitted from a display surface may be focused at a fixed focal plane and/or focal length from the display surface. But virtual objects may be "located" either in front of or behind the focal plane. Head-mounted displays commonly try to reproduce binocular disparity for such virtual objects, which is the main visual cue for depth. But the binocular disparity cue may drive the eyes to verge at one distance, while the light rays coming from the virtual plane may produce retinal blur that drives the eyes to accommodate to another distance by changing optical power, creating a conflict between those depth cues and forcing the viewer's brain to unnaturally adapt to conflicting cues. The conflict occurs because human eyes are trained to quickly focus on visual objects using an accommodation-vergence reflex that causes the eyes to automatically adjust their optical focus based on the perceived distance to the objects determined via vergence. This vergence-accommodation conflict may in turn produce ocular discomfort and/or visual fatigue during prolonged use of an artificial reality system, particularly when virtual objects perceived to be in relatively close proximity to the user's eyes are displayed.

The present disclosure is generally directed to display devices that may mitigate the vergence-accommodation conflict using lens arrays that have multiple array sections that are independently operable to focus light at selected focal lengths from the displays. The variable focal lengths may be utilized to produce images that can be perceived by a viewer in a manner consistent with real-world environments that include objects located at various distances from the viewer. As will be explained in greater detail below, embodiments of the present disclosure may selectively focus light emitted from displays at a variety of different focal lengths. Because the array sections can be operated independently, light from two or more display regions may be simultaneously focused at separate focal lengths to produce a light field display that provides a perception of different depths for separate virtual objects and/or surfaces that are concurrently displayed. Accordingly, the disclosed lens arrays and display devices may produce a more realistic virtual experience that results in greater user comfort during use while reducing visual fatigue.

Features from any of the embodiments described herein may be used in combination with one another in accordance with the general principles described herein. These and other embodiments, features, and advantages will be more fully understood upon reading the following detailed description in conjunction with the accompanying drawings and claims. The following will provide, with reference to FIGS. 1-15, detailed descriptions of lens arrays, display devices, and methods for using the same.

FIG. 1 shows a portion of an exemplary liquid lens array 100 for use in a display device in accordance with various embodiments. Liquid lens array 100 may be positioned so as to overlap a light-emitting region of the display device (see, e.g., FIGS. 3A-4). As shown in FIG. 1, liquid lens array 100 may include a plurality of array sections 101 that are aligned with each other along a common plane. Each of the array sections 101 may include an aperture plate 104 with a plurality of liquid lenses 102 within apertures 110 of the aperture plate 104. Each liquid lens 102 may be positioned over a corresponding pixel location of the light-emitting region such that the liquid lens 102 is disposed in the path of emitted display light corresponding to one or more pixels and/or sub-pixels.

As will be described in greater detail below, the liquid lenses 102 in each array section 101 may be selectively adjusted to focus light emitted from corresponding pixel locations of the light-emitting region at a particular focal length in front of the array section 101. For example, liquid lenses 102 in one or more array sections 101 of liquid lens array 100 may receive light corresponding to a virtual image object from a portion of an overlapping light-emitting region. The received light may then be focused by the liquid lenses 102 at a focal length that corresponds to the location and proximity of the virtual object in relation to a user's eyes. The focal length may be selected such that the amount of optical focus adjustment required for the user to clearly view the virtual object closely approximates that required to view a real-world object located at the same distance. Accordingly, the focal length of the emitted light may provide the user with a more realistic visual perception of the virtual object. Additionally, the accommodation of the user's eyes required to focus on the object may better match the vergence of their eyes towards the object, reducing or eliminating negative effects due to a perceived mismatch between the two.

In various embodiments, array sections 101 may each be operable independently from each other to selectively adjust the focal lengths to correspond to different virtual locations of three-dimensional objects and/or surfaces displayed by various regions of the display device. Accordingly, liquid lenses 102 in each array section 101 may be adjusted to have a focal length that differs, at a particular moment in time, from liquid lenses 102 in one or more other array sections 101 of liquid lens array 100. For example, liquid lenses 102 in two or more array sections 101 may have separate focal lengths corresponding to two or more virtual objects and/or surface regions positioned at different depths from the user's eyes (see, e.g., FIG. 4). While array sections 101 shown in FIG. 1 have square-shaped peripheries arranged in regular rows and columns, array sections 101 may have any other suitable shape and may be arranged according to any suitable layout. Each array section 101 may have any suitable number of liquid lenses 102. For example, an array section 101 may have between four liquid lenses and approximately 100 or more liquid lenses (e.g., between approximately 10 and approximately 50 liquid lenses).

Figure 2A:
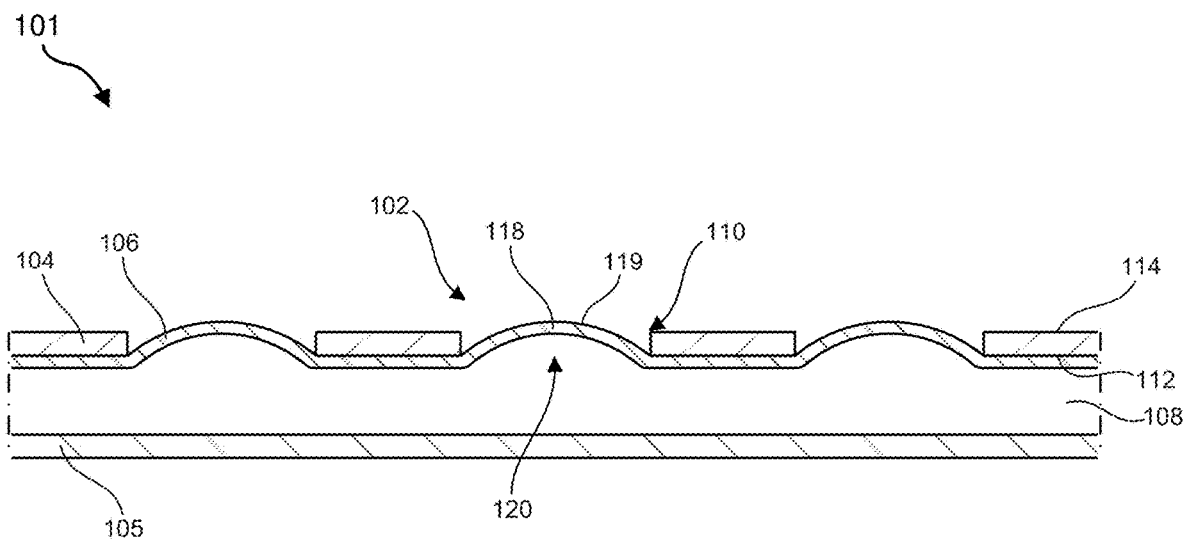
FIG. 2A is a cross-sectional side view of a portion of an exemplary liquid lens array section that includes multiple liquid lenses formed within apertures of an aperture plate in accordance with embodiments of this disclosure.
Figure 2B:
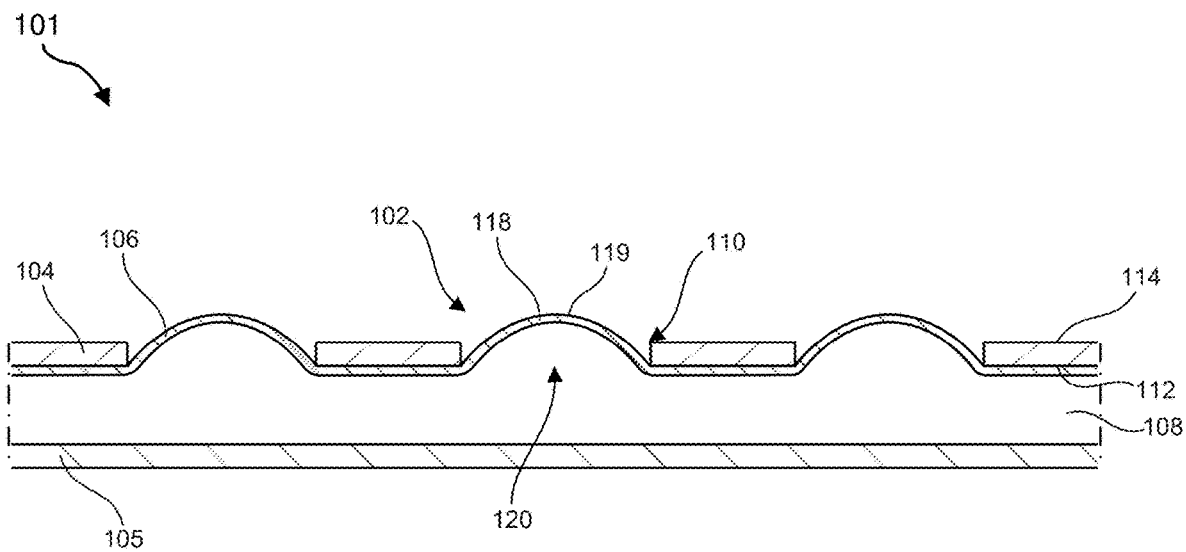
FIG. 2B is a cross-sectional side view of the portion of the liquid lens array section of FIG. 2A with the liquid lenses in a different focus state in accordance with embodiments of this disclosure.

FIGS. 2A and 2B illustrate cross-sectional views of a portion an array section 101 of liquid lens array 100, with liquid lenses 102 respectively shown in two different focus states. As shown in these figures, array section 101 may include a transparent base layer 105 on a back side facing toward a light-emitting region (see, e.g., FIGS. 3A-4) of the display device. Aperture plate 104 may be located on a front side facing away from the light-emitting region and toward a user's eye. A plurality of apertures 110 corresponding to liquid lenses 102 may be defined in aperture plate 104, with apertures 110 extending through aperture plate 104 between an inner surface 112 of aperture plate 104 facing transparent base layer 105 and an outer surface 114 of aperture plate 104.

A liquid reservoir 108 may be disposed between transparent base layer 105 and aperture plate 104. Liquid reservoir 108 may provide liquid for liquid lenses 102 located within apertures 110. Liquid reservoir 108 may include any suitable liquid, such as water or an aqueous solution, an oil-based composition, and/or any other suitable liquid composition having a desired viscosity, surface tension, and/or polarity. In some examples, as shown, an elastomeric layer 106 may be disposed between liquid reservoir 108 and aperture plate 104, with portions of elastomeric layer 106 extending over apertures 110. Elastomeric layer 106 may include a deformable elastomeric polymer material that is optically transparent. The elastomeric polymer may include, for example, a silicone, acrylate, fluoropolymer, and/or acrylic polymer and/or an elastomer formed from one or more polymerized monomers, such as ethyl acrylate, butyl acrylate, octyl acrylate, ethyethoxy, ethyl acrylate, 2-chloroethyl vinyl ether, chloromethyl acrylate, methacrylic acid, allyl glycidyl ether, and/or N-methylol acrylamide.

In various embodiments, each liquid lens 102 may include a lens liquid volume 120 extending at least partially through the corresponding aperture 110. Each lens liquid volume 120 may force an adjacent portion of elastomeric layer 106 at least partially through a corresponding aperture 110 defined in aperture plate 104 to produce a convex portion 118. Each convex portion 118 may form an arcuate lens surface 119 that focuses light passing through liquid lens 102. Convex portions 118 of liquid lenses 102 may be concurrently adjusted by, for example, changing the pressure of liquid in liquid reservoir 108, resulting in an increase or decrease in the lens liquid volume 120 in each liquid lens 102. For example, as shown in FIG. 2A, a lower pressure in liquid reservoir 108 may force a smaller amount of liquid into lens liquid volume 120 in each of liquid lenses 102, producing less deformation in elastomeric layer 106 such that each lens surface 119 has a relatively larger radius of curvature. In this example, each liquid lens 102 may have a lower optical power and a longer focal length.

As shown in FIG. 2B, increasing the pressure in liquid reservoir 108 may force liquid from liquid reservoir 108 against elastomeric layer 106 in each liquid lens 102, increasing the pressure against lens portions of elastomeric layer 106 within apertures 110 and increasing the lens liquid volumes 120 so as to expand convex portions 118. Each lens surface 119 in this example may have a smaller radius of curvature then that illustrated in FIG. 2A. As such, each liquid lens 102 shown in FIG. 2B may have a higher optical power and a shorter focal length. Varying the pressure in liquid reservoir 108 may enable liquid lenses 102 to be concurrently adjusted between two or more different focus states, with each of the plurality of focus states corresponding to a selected pressure applied to liquid reservoir 108.

The pressure of liquid within liquid reservoir 108 may be increased in any suitable manner as described herein. For example, as will be described in greater detail below with respect to FIGS. 6A-7B, a portion of array section 101 surrounding liquid reservoir 108 may be expanded or contracted (e.g., using a dielectric elastomer actuator) to increase or decrease the total volume and/or pressure of liquid within liquid reservoir 108. Additionally or alternatively, liquid reservoir 108 may be connected to a fluid source, such as an external reservoir, that increases or decreases the pressure of liquid within liquid reservoir 108. For example, an external reservoir may include a pump and/or a deformable pressurizing member, such as a diaphragm. In some examples, liquid reservoir 108 may be connected to a pressurized liquid supply source that supplies liquid to reservoirs of multiple array sections 101, with the pressure supplied to each liquid reservoir 108 controlled using an adjustable valve. In at least one example, transparent base layer 105 may act as an electrowetting plate that, in response to a change in voltage applied to the liquid in liquid reservoir 108, adjusts a contact angle between a surface of the liquid at a peripheral region of liquid reservoir 108 and transparent base layer 105 so as to adjust the liquid volume and/or pressure in liquid reservoir 108. For example, liquid reservoir 108 may include an electrically conductive liquid (e.g., water, an electrolytic solution, etc.) that changes contact angle based on a voltage difference between aperture plate 104 and transparent base layer 105, which may each include electrically conductive materials to which separate voltages are applied.

According to at least one example, liquid reservoir 108 and lens liquid volumes 120 of liquid lenses 102 may each include the same liquid or liquid composition. In certain examples, liquid reservoir 108 and/or each lens liquid volume 120 may include two or more separate liquids and/or liquid compositions, such as two immiscible liquid compositions. For example, at least a portion of liquid reservoir 108, such as a majority of liquid reservoir 108, contacting transparent base layer 105 may include a first liquid composition, such as a polar composition (e.g., an aqueous solution, a polar solvent-based composition, etc.). Another portion of liquid reservoir 108 adjacent elastomeric layer 106, as well as lens liquid volume 120 of each liquid lens 102, may include a second liquid composition, such as an oil-based composition or a relatively non-polar composition (e.g., a non-polar solvent-based composition) that is immiscible or substantially immiscible with the first liquid composition. In such an example, pressure may be applied to the first liquid composition, thereby increasing the proportion of the first composition in the region of liquid reservoir 108 between aperture plate 104 and transparent base layer 105 and forcing at least some of the second liquid composition from liquid reservoir 108 into portions of liquid lenses 102 within apertures 110 of aperture plate 104 to increase the lens liquid volume 120 in each liquid lens 102.

FIGS. 3A and 3B illustrate differences in focusing power of a liquid lens 102 of array section 101 in two different focus states. As shown in these figures, liquid lens 102 may be positioned over a portion of a light-emitting array 122 that includes a light-emitting region 123. Light-emitting array 122 may include any suitable type of light-emitting display technology, including a liquid crystal display (LCD), a light emitting diode (LED) display, an organic LED (OLED) display, a quantum dot (QLED) display, an inorganic light emitting diode (ILED) display, an active-matrix organic light-emitting diode (AMOLED) display, a transparent organic light emitting diode (TOLED) display, a waveguide display, a digital light processing (DLP) display, a microLED display, a liquid crystal on silicon (LCOS) display, a ferroelectric liquid crystal on silicon (fLCOS) display, or another suitable transparent display, or some combination thereof. Light emitted from light-emitting region 123 may include light from one or more individual pixels and/or sub-pixels. For example, light from light-emitting region 123 may correspondence to a plurality of sub-pixels for producing one or more pixels, the plurality of sub-pixels each emitting one of a plurality of different colors (e.g., red, green, and blue) used to generate an image.

FIG. 3A shows liquid lens 102 in a first focus state corresponding to a lower optical power (see, e.g., FIG. 2A). As illustrated in this figure, emitted light 124 from light-emitting region 123 may be incident on transparent base layer 105, passing through liquid reservoir 108, lens liquid volume 120, and convex portion 118 of elastomeric layer 106. In some examples, a liquid in liquid reservoir 108 and/or lens liquid volume 120 may have an index of refraction that is similar or the same as an index of refraction of the material of elastomeric layer 106 so that light passing from the liquid to elastomeric layer 106 experiences a minimal or negligible amount of refraction. Lens surface 119 on convex portion 118 of elastomeric layer 106 may contact air or another surrounding medium having an index of refraction that differs from the material of elastomeric layer 106. Accordingly, light exiting lens surface 119 may be refracted and focused in accordance with the curvature of lens surface 119, with the exiting light represented in FIG. 3A as focused light 126. As shown, focused light 126 may be focused toward focal point 128, which is located at a focal length 129 from array section 101.

FIG. 3B shows liquid lens 102 in a second focus state corresponding to a higher optical power (see, e.g., FIG. 2B). Liquid lens 102 in this figure includes a greater lens liquid volume 120 than that shown in FIG. 3A, resulting in greater deformation of convex portion 118 such that lens surface 119 has a smaller radius of curvature. Accordingly, emitted light 124 may be refracted to a greater extent by lens surface 119, producing focused light 130 that is focused at focal point 132, which is located at a shorter focal length 133 from array section 101 in comparison to that illustrated in FIG. 3A.

In various embodiments, light from light-emitting array 122 may be selectively focused at any one of a plurality of different focal lengths by adjusting the focus state of liquid lens 102. When utilized in a display device, array sections 101 including liquid lenses 102 may enable separate regions of light-emitting array 122 to be focused at different focal lengths, giving portions of images displayed in the these regions the appearance, from a user's perspective, of being located at different distances from the user's eyes. Additionally, array sections 101 may each be individually adjustable, allowing for different portions of an image produced by light-emitting array 122 to be focused at different focal lengths corresponding to different virtual distances. Additionally or alternatively, liquid lenses may be adjusted to focus light so to accommodate different gap distances between the user's eyes and the display surface. The proximity of a user's eye to a viewed portion of the display surface may vary based on changes in the direction of the user's gaze and/or other factors, such as the fit of the display device.

Figure 4:
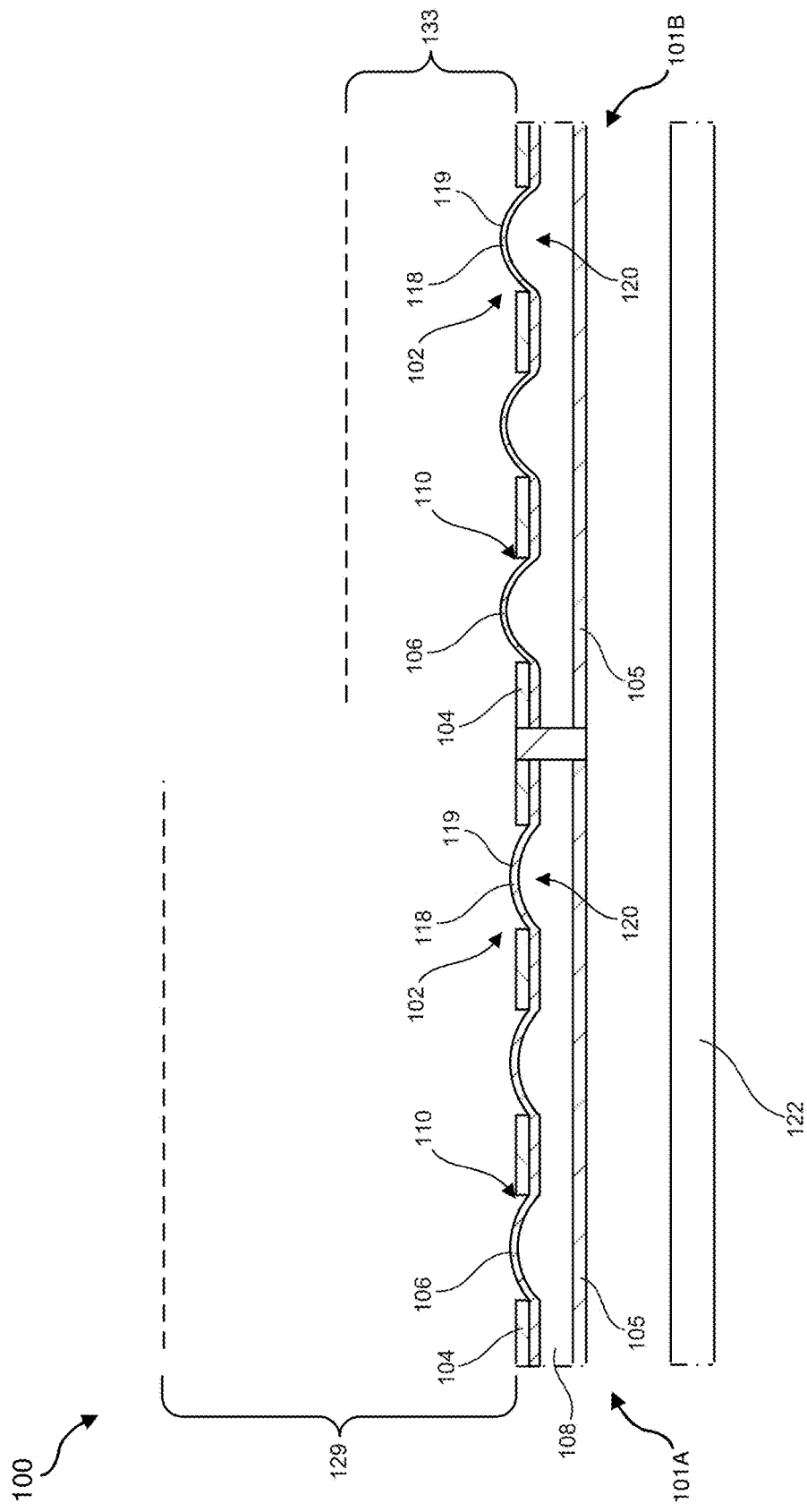
FIG. 4 is a cross-sectional side view of a portion of an exemplary liquid lens array illustrating portions of two array sections that each respectively include liquid lenses in separate focus states to focus light at different focal lengths in accordance with embodiments of this disclosure.

FIG. 4 illustrates portions of two adjacent array sections 101, specifically first array section 101A and second array section 101B. As shown, liquid reservoir 108 of first array section 101A may be partitioned from liquid reservoir 108 of second array section 101B with, for example, a side wall 140 disposed between the respective liquid reservoirs 108. Accordingly, separate pressures may be exerted on each liquid reservoir 108 such that liquid lenses 102 of first array section 101A and liquid lenses 102 of second array section 101B are in separate respective focus states. In some embodiments, as shown, first array section 101A may be adjusted so that light from an overlapping region of light-emitting array 122 is focused at a focal length 129. Second array section 101B may be separately adjusted so that light from another overlapping region of light-emitting array 122 is focused at a shorter focal length 133.

Figure 5A:
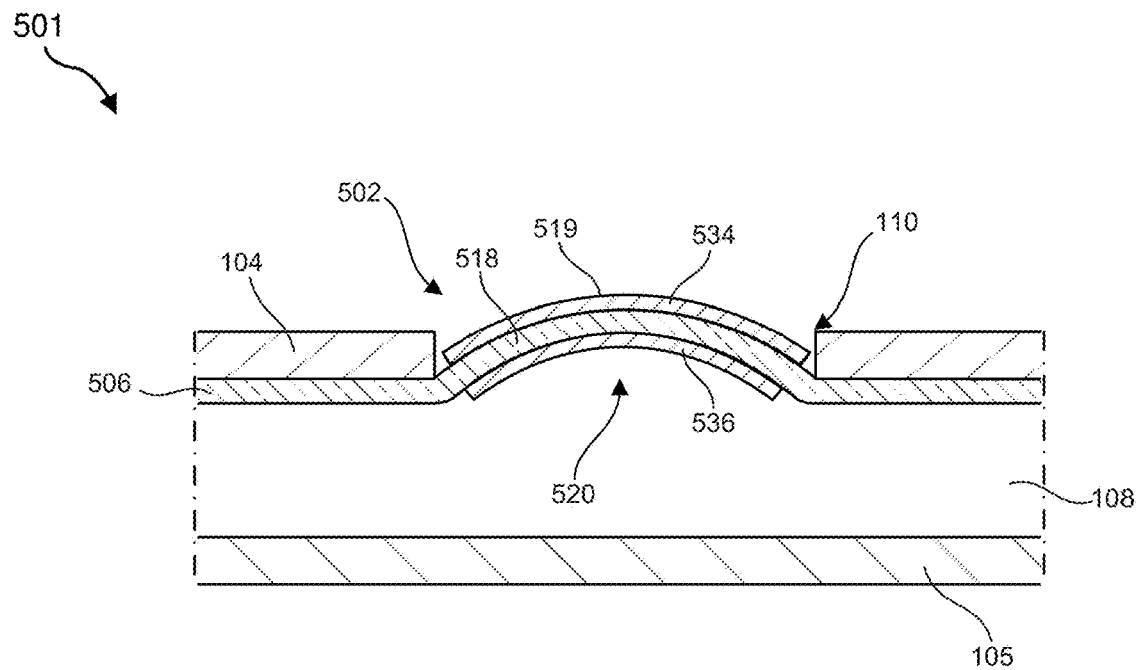
FIG. 5A is a cross-sectional side view of an exemplary liquid lens array section that includes multiple lenses formed within apertures of an aperture plate in accordance with embodiments of this disclosure.
Figure 5B:
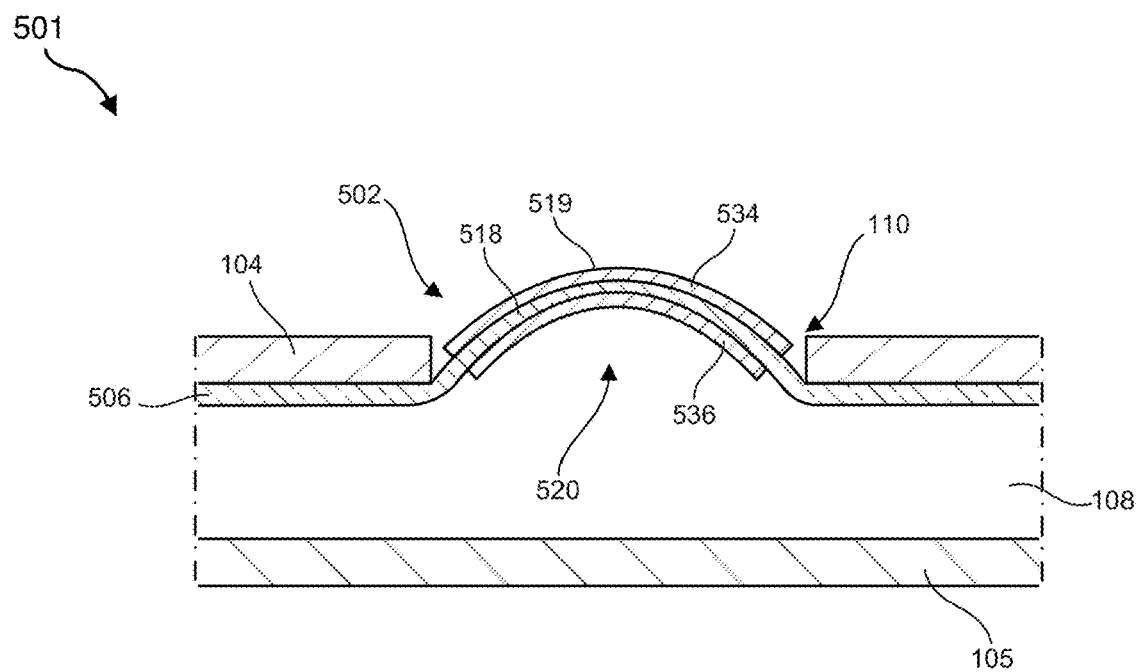
FIG. 5B is a cross-sectional side view of the liquid lens array section of FIG. 5A with lenses in a different focus state in accordance with embodiments of this disclosure.

FIGS. 5A and 5B illustrate a portion of an exemplary array section 501 including a liquid lens 502 having a deformable electroactive polymer membrane. As shown, array section 501 may include a dielectric elastomer layer 506 disposed between liquid reservoir 108 and aperture plate 104. Dielectric elastomer layer 506 may include a deformable, electroactive polymer that is optically transparent. The electroactive polymer may, for example, be symmetric with regard to electrical charge (e.g., polydimethylsiloxane (PDMS), acrylates, etc.) or asymmetric (e.g., poled polyvinylidene fluoride (PVDF) or its co-polymers such as poly (vinylidenefluoride-co-trifluoroethylene) (PVDF-TrFE)). In some embodiments, dielectric elastomer layer 506 may additionally or alternatively include an acrylic elastomer and/or an elastomer formed from polymerized monomers such as ethyl acrylate, butyl acrylate, octyl acrylate, ethyethoxy ethyl acrylate, 2-chloroethyl vinyl ether, chloromethyl acrylate, methacrylic acid, allyl glycidyl ether, and/or N-methylol acrylamide.

In the presence of an electrostatic field, dielectric elastomer layer 506 may deform (e.g., compress, elongate, bend, etc.) according to the magnitude and direction of the applied field. Generation of such a field may be accomplished, for example, by disposing at least a portion of dielectric elastomer layer 506 between two transparent electrodes, such as first electrode 534 and second electrode 536, each of which is at a different potential. As the potential difference (i.e., voltage difference) between first electrode 534 and second electrode 536 is increased or decreased, the amount of deformation may also increase or decrease. The physical origin of the compressive nature of electroactive polymers in the presence of an electrostatic field, being the force created by Coulombic attraction between opposite electric charges, is that of the Maxwell stress.

With no electrostatic field, the electroactive polymer may be in its relaxed state undergoing no electrostatically induced deformation. However, in some examples, liquid reservoir 108 may be maintained at a pressure that is elevated in comparison to a region surrounding the exterior of array section 501, forcing lens liquid volume 520 into aperture 110 and deforming dielectric elastomer layer 506, as well as first electrode 534 and second electrode 536, to form a convex portion 518 extending at least partially through aperture 110, as shown in FIG. 5A. In various examples, first electrode 534 and second electrode 536 may each be configured to stretch elastically. In such embodiments, first electrode 534 and/or second electrode 536 may include transparent conductive oxides (i.e., TCOs, such as indium tin oxide, zinc oxide, etc.), graphene, carbon nanotubes, and/or any other suitable material that may allow for stretching and contraction of first electrode 534 and second electrode 536 in conjunction with deformation of an adjacent portion of dielectric elastomer layer 506. In some examples, an outer surface of first electrode 534 may form a lens surface 519, or a portion thereof, which refracts and focuses light passing through liquid lens 502.

As shown in FIG. 5B, when an electrostatic field is developed between first electrode 534 and second electrode 536 by the application of different voltages to these electrodes, a portion of dielectric elastomer layer 506 between first electrode 534 and second electrode 536 may be deformed so that dielectric elastomer layer 506 is further pushed through aperture 110, forming a convex portion 518 having a smaller radius of curvature and increasing the optical power of liquid lens 502. For example, a portion of dielectric elastomer layer 506 disposed between first electrode 534 and second electrode 536 and surrounded by aperture 110 may be compressed in the presence of the electrostatic field so that the portion of dielectric elastomer layer 506 is reduced in thickness while being expanded laterally, forming a more arcuate convex portion 518 surrounding a greater lens liquid volume 520 than that illustrated in FIG. 5A. Lens liquid volume 520 may be forced against convex portion 518 and/or second electrode 536 due to the elevated pressure of liquid in liquid reservoir 108, with the pressure in liquid reservoir 108 being reduced at least slightly when liquid is conveyed from liquid reservoir 108 to fill the increased lens liquid volume 520 of liquid lens 502 (see, e.g., FIG. 5B). Subsequently reducing the voltage difference between first electrode 534 and second electrode 536 may cause dielectric elastomer layer 506 in aperture 110 to again thicken, resulting in lateral contraction of dielectric elastomer layer 506 that reduces the lens liquid volume 520 in liquid lens 502 and increases the radius of curvature of convex portion 518. Accordingly, the shape of liquid lens 502 may be adjusted by selectively applying voltages to first electrode 534 and second electrode 536 while an elevated pressure is maintained in liquid reservoir 108.

Figure 6A:
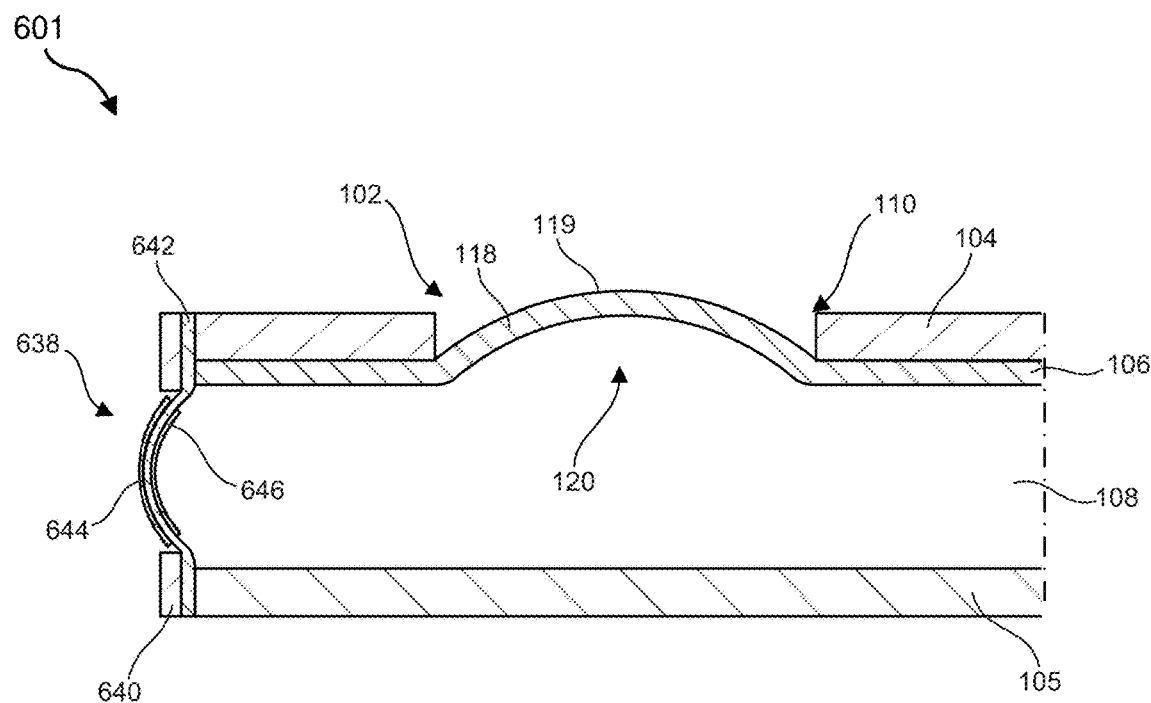
FIG. 6A is a cross-sectional side view of an exemplary liquid lens array section that includes a fluid displacement member located in a peripheral side wall in accordance with embodiments of this disclosure.
Figure 6B:
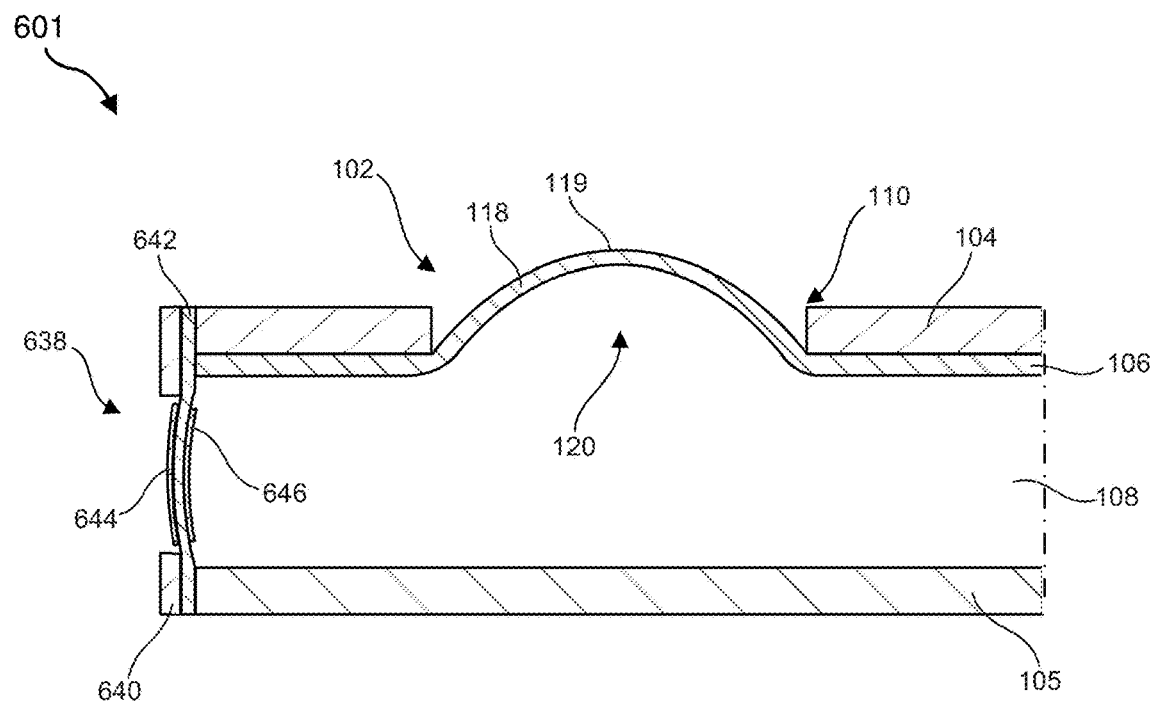
FIG. 6B is a cross-sectional side view of the liquid lens array section of FIG. 6A with lenses in a different focus state in accordance with embodiments of this disclosure.

FIGS. 6A and 6B illustrate a portion of an exemplary array section 601 that includes a liquid lens 102 (see, e.g., FIGS. 2A-4) and a fluid displacement member located at a periphery of liquid reservoir 108. As shown in FIGS. 6A and 6B, array section 601 may include at least one fluid displacement member 638 disposed in a side wall 640 surrounding a peripheral portion of liquid reservoir 108. Fluid displacement member 638 may include a portion of a dielectric elastomer layer 642, which may, for example, be located between liquid reservoir 108 and a portion of side wall 640, with a portion of dielectric elastomer layer 642 forming fluid displacement member 638 disposed in an opening defined in side wall 640. Dielectric elastomer layer 642 may include a deformable, electroactive polymer, including any of the electroactive polymers described above. In the presence of an electrostatic field formed by, for example, a first electrode 644 and a second electrode 646 disposed on opposing surfaces, dielectric elastomer layer 642 may deform (e.g., compress, elongate, bend, etc.) according to the magnitude and direction of the applied field.

As the voltage difference between first electrode 644 and second electrode 646 is increased or decreased, the amount of deformation may also increase or decrease. For example, with the liquid in liquid reservoir 108 maintained at an elevated pressure in comparison to the surrounding environment, dielectric elastomer layer 642 may be compressed in the presence of an electrostatic field generated between first electrode 644 and second electrode 646 so as to reduce the thickness of dielectric elastomer layer 642 while expanding dielectric elastomer layer 642 laterally to form a more arcuate, outwardly-extended shape surrounding a greater volume of liquid, as shown in FIG. 6A. Because an increased volume of liquid from liquid reservoir 108 is surrounded by the outwardly expanded fluid displacement member 638, less pressure may be exerted by liquid reservoir 108 on portions of elastomeric layer 106 forming liquid lenses 102, resulting in liquid lenses 102 having minimal curvature and lower optical power, as shown in FIG. 6A.

Subsequently, as shown in FIG. 6B, reducing the voltage difference between first electrode 644 and second electrode 646 may result in expansion of dielectric elastomer layer 642 in its thickness direction so that fluid displacement member 638 retracts inwardly and assumes a less arcuate shape. In this state, fluid displacement member 638 may exert increased pressure on liquid reservoir 108, which in turn increases pressure exerted against portions of elastomeric layer 106 forming liquid lenses 102, thereby increasing the curvature and the optical power of each liquid lens 102.

Figure 7A:
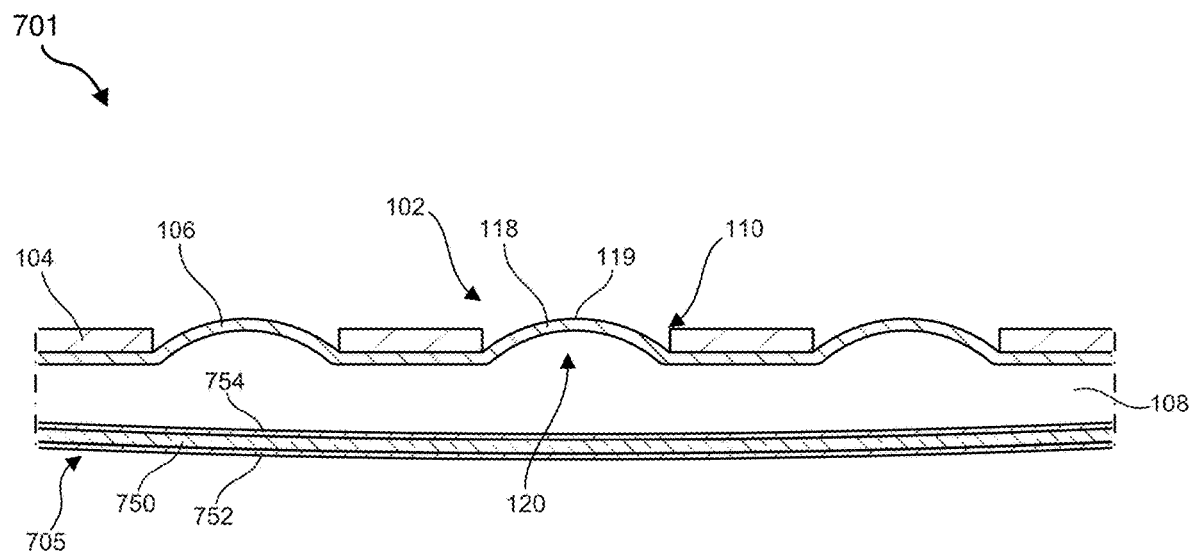
FIG. 7A is a cross-sectional side view of an exemplary liquid lens array section that includes an electroactive base layer for displacing fluid in accordance with embodiments of this disclosure.
Figure 7B:
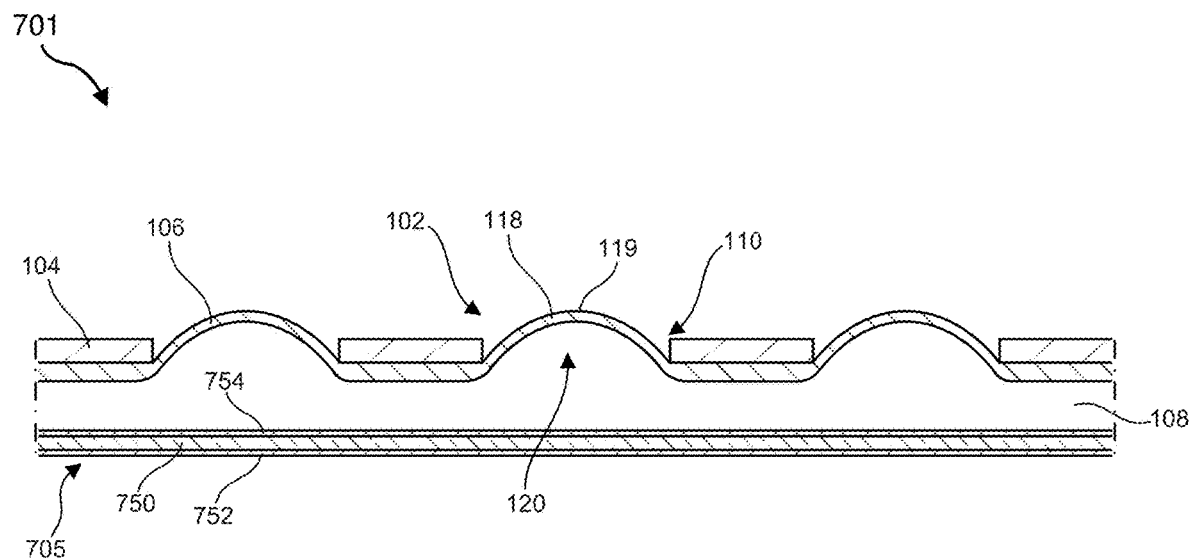
FIG. 7B is a cross-sectional side view of the liquid lens array section of FIG. 7A with lenses in a different focus state in accordance with embodiments of this disclosure.

FIGS. 7A and 7B illustrate a portion of an exemplary array section 701 including several liquid lenses 102 (see, e.g., FIGS. 2A-4). As shown in FIGS. 7A and 7B, array section 701 may include a deformable electroactive base layer 705 in place of the more rigid transparent base layer 105 shown in other embodiments. Electroactive base layer 705 may include a deformable, electroactive polymer, including any of the electroactive polymers described above. In the presence of an electrostatic field formed by, for example, a first electrode 752 and a second electrode 754 disposed on opposing surfaces, dielectric elastomer layer 750 may deform (e.g., compress, elongate, bend, etc.) according to the magnitude and direction of the applied field. As the voltage difference between first electrode 752 and second electrode 754 is increased or decreased, the amount of deformation may also increase or decrease. For example, with the liquid in liquid reservoir 108 maintained at an elevated pressure in comparison to the surrounding environment, dielectric elastomer layer 750 may be compressed in the presence of an electrostatic field generated between first electrode 752 and second electrode 754 so as to reduce the thickness of dielectric elastomer layer 750 while expanding dielectric elastomer layer 750 laterally to form a more arcuate, outwardly-extended shape that increases the overall volume of liquid reservoir 108, as shown in FIG. 7A. Accordingly, less pressure may be exerted by liquid reservoir 108 on portions of elastomeric layer 106 forming liquid lenses 102, resulting in liquid lenses 102 having minimal curvature and lower optical power, as shown in FIG. 7A.

Subsequently, as shown in FIG. 7B, reducing the voltage difference between first electrode 752 and second electrode 754 may result in expansion of dielectric elastomer layer 750 in the thickness direction so that electroactive base layer 705 retracts inwardly and assumes a less arcuate shape. In this state, electroactive base layer 705 may exert increased pressure on liquid reservoir 108, which in turn raises pressure exerted against portions of elastomeric layer 106 forming liquid lenses 102, thereby increasing the curvature and the optical power of each liquid lens 102.

Figure 8A:
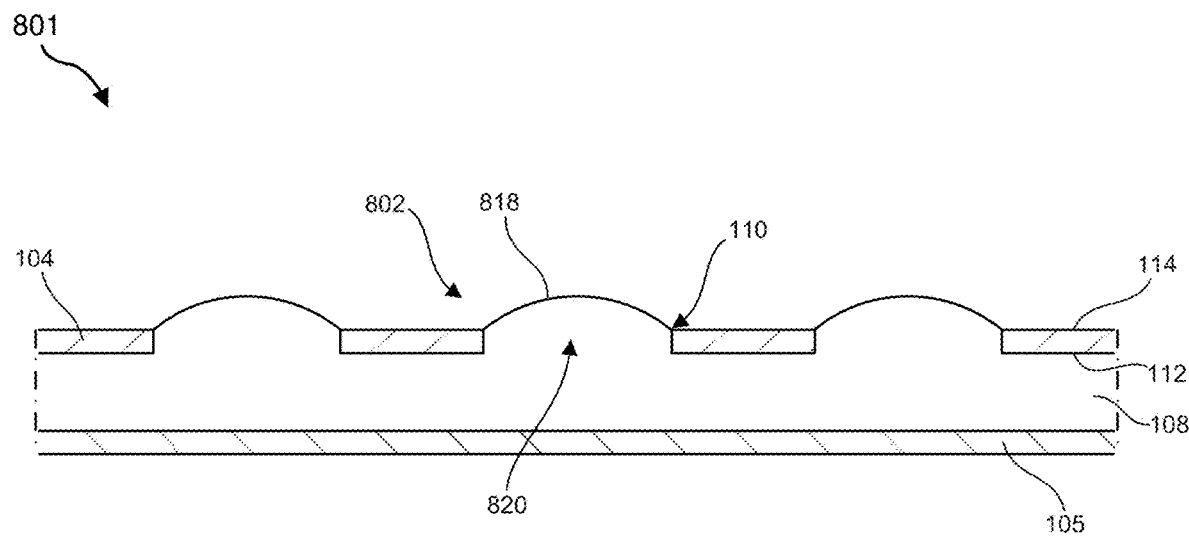
FIG. 8A is a cross-sectional side view of an exemplary liquid lens array section that includes multiple liquid lenses in accordance with embodiments of this disclosure.
Figure 8B:
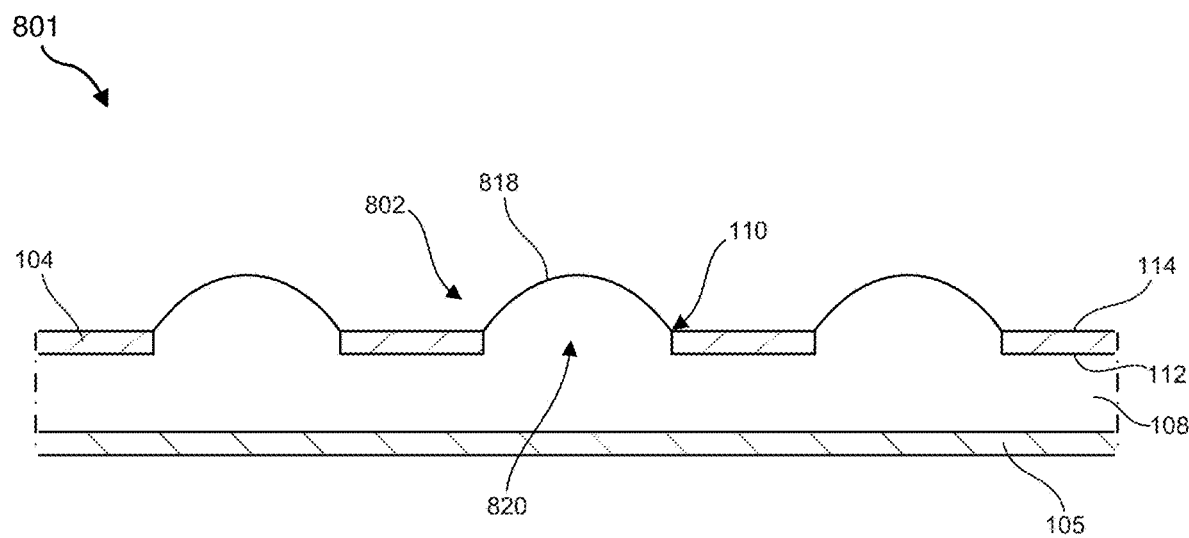
FIG. 8B is a cross-sectional side view of the liquid lens array section of FIG. 8A with lenses in a different focus state in accordance with embodiments of this disclosure.

FIGS. 8A and 8B illustrate a portion of an exemplary array section 801 having liquid lenses 802 with lens surfaces that are formed by surface portions of a fluid extending through apertures 110 defined in aperture plate 104. As shown in these figures, various pressures may be selectively applied to liquid reservoir 108 to force a selected lens liquid volume 820 through each aperture 110 to form liquid lenses 802. Rather than pushing against and deforming an adjacent elastomeric layer, each lens liquid volume 820 may extend through a corresponding aperture 110 beyond outer surface 114 of aperture plate 104, forming a convex meniscus 818 protruding from aperture 110. In some examples, a periphery of meniscus 818 may be pinned at an edge formed at the intersection of aperture 110 and outer surface, preventing spreading of the liquid over outer surface 114 and/or retraction of the meniscus periphery into aperture 110. When less pressure is exerted by liquid reservoir 108, meniscus 818 may form a lens surface having a minimal curvature (i.e., a larger radius of curvature) and lower optical power, as shown in FIG. 8A. Subsequently, as shown in FIG. 8B, pressure exerted on liquid reservoir 108 may be raised, which may in turn increase both the lens liquid volume 820 in each aperture 110 and the curvature (i.e., a smaller radius of curvature) of each meniscus 818, thereby raising the optical power of each liquid lens 802.

Figure 9:
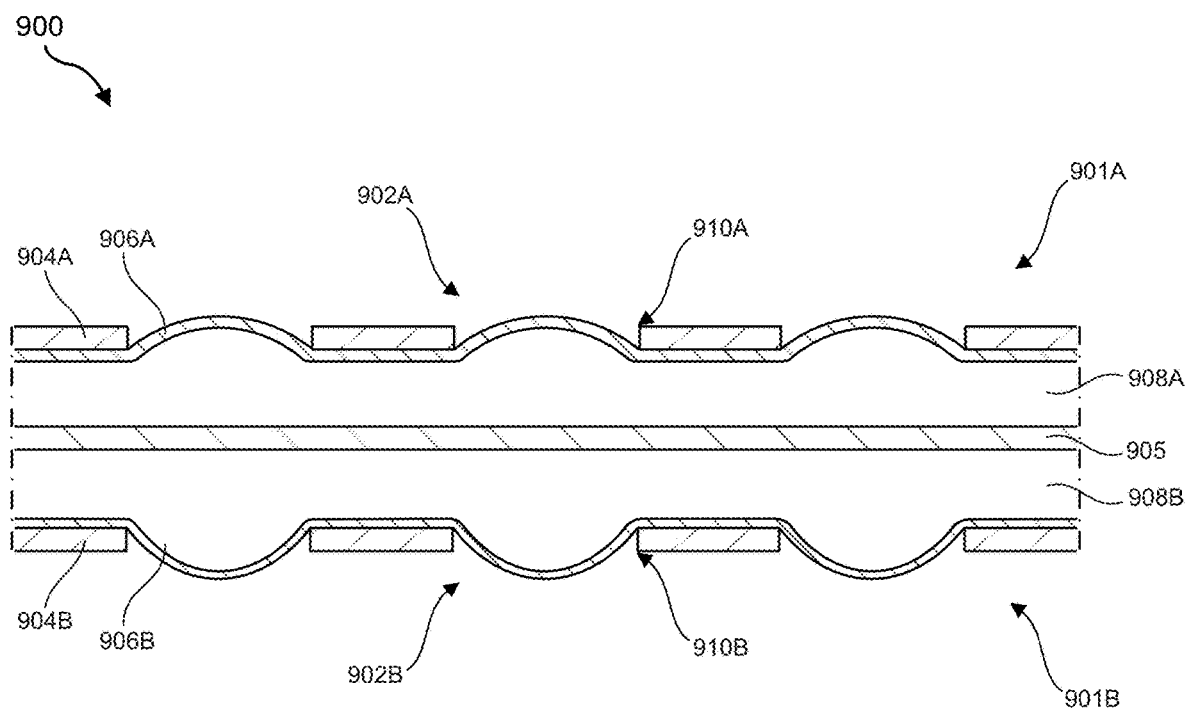
FIG. 9 is a cross-sectional side view of an exemplary liquid lens array that includes a pair of overlapping liquid lens array sections in accordance with embodiments of this disclosure.

In at least one embodiment, a liquid lens array may include two or more overlapping array sections configured to overlap a light-emitting array. FIG. 9 illustrates a portion of an exemplary liquid lens array 900 that includes a pair of overlapping array sections in accordance with embodiments of this disclosure. As shown in FIG. 9, liquid lens array 900 may include a first array section 901A overlapping a second array section 901B such that optical axes of liquid lenses 902A of first array section 901A are aligned or substantially aligned with optical axes of corresponding liquid lenses 902B of second array section 901B. Each pair of overlapping liquid lenses 902A and 902B may be positioned over a corresponding pixel location of a display light-emitting region. First and second array sections 901A and 901B may each include a respective aperture plate 904A and 904B and a plurality of liquid lenses 902A and 902B that are each positioned within a corresponding aperture 910A or 910B.

First and second array sections 901A and 901B may include separate liquid reservoirs 908A and 908B. For example, liquid reservoirs 908A and 908B may be separated from each other by a transparent base layer 905 as shown in FIG. 9. While FIG. 9 illustrates a single transparent base layer 905 between liquid reservoirs 908A and 908B, in some examples, multiple layers, such as a separate base layer for each reservoir, may be disposed between liquid reservoirs 908A and 908B. First and second array sections 901A and 901B may be arranged in any suitable configuration. For example, as shown in FIG. 9, first and second array sections 901A and 901B may be arranged abutting each other with convex surfaces of liquid lenses 902A facing away from convex surfaces of liquid lenses 902B. Alternatively, first and second array sections 901A and 901B may be separated from each other, and in some examples, first and second array sections 901A and 901B may be positioned such that convex surfaces of liquid lenses 902A face in the same direction as convex surfaces of liquid lenses 902B.

In at least one embodiment, elastomeric layers 906A and 906B may be disposed respectively between liquid reservoirs 908A and 908B and aperture plates 904A and 904B. In various examples, elastomeric layers 906A and 906B may each include a deformable elastomeric polymer material, as shown, for example, in FIGS. 2A-7B. In some examples, first and second array sections 901A and 901B may include a plurality of liquid lenses that are each formed by a convex liquid meniscus protruding from a corresponding aperture 910A or 910B (see, e.g., FIGS. 8A and 8B).

The combination of each pair of overlapping liquid lenses 902A and 902B may provide an increased range and/or customizability of optical powers produced by liquid lens array 900 in comparison to a liquid lens array having a non-overlapped array section. For example, liquid lenses 902A of first array section 901A may be selectively adjusted independently of liquid lenses 902B of second array section 901B. Accordingly, a variety of combinations of lens shapes may be formed by pairs of liquid lenses 902A and 902B. In some examples, liquid lenses 902A and 902B may be adjustable to alternately provide both positive and negative optical powers. The shapes of liquid lenses 902A and 902B may be adjusted in accordance with any of the embodiments described herein.

Figure 10:
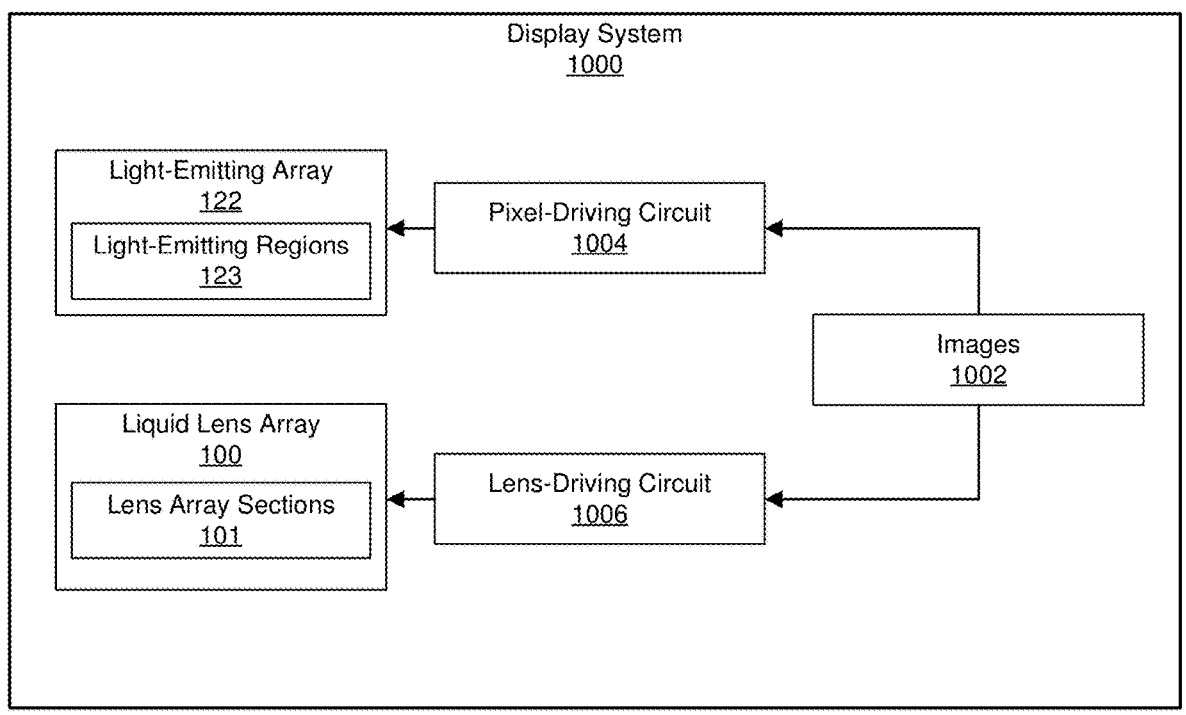
FIG. 10 is diagram of an exemplary display system that includes an adjustable liquid lens array in accordance with embodiments of this disclosure.

FIG. 10 is a block diagram of an exemplary display system 1000 that may present one or more images 1002 to a user. In some examples, display system 1000 may operate in a virtual reality system environment, an augmented reality system environment, a mixed reality system environment, or some combination thereof. In some examples, some or all of display system 1000 may be included in a head-mounted display device (such as those illustrated in FIGS. 12 and 13).

As shown, display system 1000 may include a pixel-driving circuit 1004 (e.g., a display driver) that presents, via light-emitting array 122 (see, e.g., FIGS. 3A-4), a variety of content to a user, including virtual views of an artificially rendered virtual-world environment and/or augmented views of a physical, real-world environment. Light-emitting array 122 may include a plurality of display regions (e.g., pixels or sub-pixels) that are individually controllable. In some examples, the augmented views may be augmented with computer-generated elements (e.g., two-dimensional (2D) or three-dimensional (3D) images, 2D or 3D video, sound, etc.). In some examples, images 1002 may convey a scene (e.g., a captured scene, an artificially-generated scene, an evolving artificial-reality environment, or a combination of the same) to the user.

As additionally shown in FIG. 10, display system 1000 may include a lens-driving circuit 1006 for controlling liquid lens array 100 (see, e.g., FIG. 1) overlapping light-emitting array 122, with array sections 101 of liquid lens array 100 capable of selectively focusing light emitted by light-emitting regions 123 of light-emitting array 122 at desired focal lengths, providing a sense of visual depth from a user's eye. The focal lengths produced by lenses in lens array sections 101 of liquid lens array 100 may be selected to match visual depth cues corresponding to binocular disparity between right- and left-eye displays of display system 1000. Lens-driving circuit 1006 may control one or more of array sections 101 in accordance with any of the techniques described herein to change the focus states of included liquid lenses 102 by adjusting the liquid volumes extending from liquid reservoirs 108 of the array sections 101 at least partially through apertures 110 defined in aperture plates 104 of the array sections 101 (see, e.g., FIGS. 1-4; see also FIGS. 5A-9).

Light-emitting array 122 may have a variety of forms. For example, light-emitting array 122 may form or be integrated into the lens or lenses of a head-mounted display device. In other examples, light-emitting array 122 may form a layer of an otherwise transparent display or housing of a head-mounted display device. In various embodiments, display system 1000 may include a single electronic display or multiple electronic displays (e.g., a display for each eye of a user) including separate light-emitting arrays 122 and liquid lens arrays 100.

Figure 11:
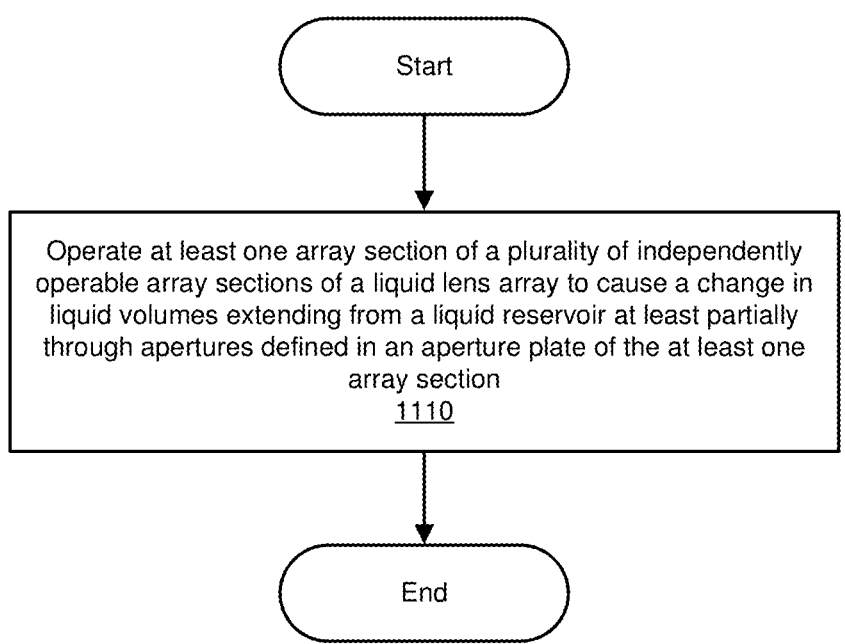
FIG. 11 is a flow diagram of an exemplary method for operating a liquid lens array in accordance with embodiments of this disclosure.

FIG. 11 is a flow diagram of an exemplary method 1100 for operating a liquid lens array in accordance with embodiments of this disclosure. As illustrated in FIG. 11, at step 1110, one or more of the systems described herein may operate at least one array section of a plurality of independently operable array sections of a liquid lens array to cause a change in liquid volumes extending from a liquid reservoir at least partially through apertures defined in an aperture plate of the at least one array section.

The systems described herein may perform step 1110 in a variety of ways. In one example, lens-driving circuit 1006 of display system 1000 may operate at least one array section 101 of a plurality of independently operable array sections 101 of liquid lens array 100 to cause a change in lens liquid volumes 120 extending from liquid reservoir 108 at least partially through apertures 110 defined in aperture plate 104 of the at least one array section 101 (see, e.g., FIGS. 1-4; see also FIGS. 5A-9).

In some embodiments, operating the at least one array section may include changing a pressure of a liquid in liquid reservoir 108 to change lens liquid volumes 120 extending from liquid reservoir 108 at least partially through apertures 110 defined in aperture plate 104 of the at least one array section 101 (see, e.g., FIGS. 2A-4; see also FIGS. 5A-9).

According to various embodiments, the method may further include operating at least one additional array section 101 of the plurality of array sections 101 of the liquid lens array 100 to cause a change in lens liquid volumes 120 of liquid extending from liquid reservoir 108 at least partially through apertures 110 defined in aperture plate 104 of the at least one additional array section 101 such that lens liquid volumes 120 of the at least one array section 101 differ from lens liquid volumes 120 of the at least one additional array section 101 (see, e.g., FIGS. 1-4; see also FIG. 9).

Display devices and systems that include the disclosed lens arrays may mitigate the vergence-accommodation conflict exhibited in conventional artificial-reality devices by selectively focusing light from various array sections to produce images of objects having focal lengths that appear to a user to correspond to appropriate locations of the objects in a three-dimensional environment. For example, the binocular disparity between images of an object displayed on left- and right-display screens of an artificial-reality device may cue the user that the object is located at a particular distance from the user's eyes. The lenses of array sections overlapping portions of the light-emitting array producing the object image may be maintained or adjusted to concurrently focus the emitted light at a focal length that corresponds to the particular distance (relative to the user) indicated by the binocular disparity. Accordingly, the displayed images may be perceived in a manner more consistent with real-world three-dimensional views, with the focal length of light from various regions of the displayed images being adjusted to match perceptual distances indicated by binocular disparities produced at those displayed image regions.

Because the array sections may be operated independently, light from two or more display regions may be simultaneously focused at separate focal lengths to provide a perception of different depths for separate virtual objects and/or surfaces that are concurrently displayed. Accordingly, the disclosed lens arrays and display devices may produce a more realistic virtual experience that results in greater user comfort during use while reducing visual fatigue. Separate array sections may allow for selective and independent control of image light focus in different regions of a display area. Because the focus of multiple pixels may be simultaneously adjusted, the amount of data required to operate the lens array and the overall system complexity may be reduced in comparison to a system that selectively adjusts the focus of individual pixels. Additionally, the liquid lenses may provide a high level of optical accuracy and consistency within a small space, allowing for relatively fast response times during adjustment.

EXAMPLE EMBODIMENTS

Example 1. A liquid lens array including a plurality of independently operable array sections, each of the plurality of array sections including (1) a transparent base layer, (2) an aperture plate overlapping the transparent base layer, the aperture plate defining a plurality of apertures extending through the aperture plate between an inner surface of the aperture plate facing the transparent base layer and an outer surface of the aperture plate, and (3) a liquid reservoir disposed between the base layer and the aperture plate. The liquid lens array may also include a driving circuit for operating at least one array section of the plurality of array sections to change liquid volumes extending from the liquid reservoir at least partially through the apertures defined in the aperture plate of the at least one array section.

Example 2. The liquid lens array of example 1, wherein each of the plurality of array sections are aligned with each other along a plane parallel to the outer surface of the aperture plate.

Example 3. The liquid lens array of example 1 or example 2, wherein the liquid reservoirs of each of the plurality of array sections are partitioned from each other.

Example 4. The liquid lens array of any one of examples 1-3, wherein the liquid volumes extending from the liquid reservoir at least partially through the apertures defined in the aperture plate of the at least one array section are changed by changing a pressure of a liquid in the liquid reservoir.

Example 5. The liquid lens array of any one of examples 1-4, wherein (1) the liquid volumes extending from the liquid reservoir at least partially through the apertures defined in the aperture plate of the at least one array section are correlated to surface shapes of lens surfaces located at the apertures, and (2) changing the liquid volumes extending from the liquid reservoir at least partially through the apertures changes the lens surface shapes of the lens surfaces.

Example 6. The liquid lens array of any one of examples 1-5, wherein the liquid volume extending at least partially through each aperture defined in the aperture plates forms a convex meniscus that acts as a lens surface.

Example 7. The liquid lens array of example 6, wherein increasing the liquid volumes extending at least partially through each aperture defined in the aperture plates decreases a radius of curvature of the convex meniscus.

Example 8. The liquid lens array of any one of examples 1-5, wherein each of the plurality of array sections further includes an elastomeric layer disposed between the liquid reservoir and the aperture plate, the elastomeric layer overlapping the plurality of apertures.

Example 9. The liquid lens array of example 8, wherein the liquid volume extending at least partially through each aperture defined in the aperture plates forces an adjacent portion of the elastomeric layer at least partially through the aperture such that the adjacent portion of the elastomeric layer has a convex surface shape that acts as a lens surface.

Example 10. The liquid lens array of example 9, wherein increasing the liquid volume extending at least partially through each aperture defined in the aperture plates decreases a radius of curvature of the convex surface shape of the adjacent portion of the elastomeric layer.

Example 11. The liquid lens array of example 8 or example 9, wherein (1) the elastomeric layer includes a dielectric elastomer, and (2) portions of the elastomeric layer overlapping the apertures are each disposed between a corresponding pair of electrodes.

Example 12. The liquid lens array of example 11, wherein the driving circuit operates an array section by applying a voltage difference between first electrodes and second electrodes of the pairs of electrodes in the array section.

Example 13. The liquid lens array of example 12, wherein increasing the voltage difference between the first electrode and the second electrode of a pair of electrodes produces an electrostatic force that compresses a portion of the elastomeric layer disposed between the first electrode and the second electrode so as to further force the portion of the elastomeric layer at least partially through a corresponding aperture while decreasing a radius of curvature of the portion of the elastomeric layer.

Example 14. The liquid lens array of any one of examples 1-13, wherein the transparent base layer includes an electrowetting surface contacting the liquid reservoir and the driving circuit operates an array section by changing an electric field applied to the electrowetting surface to change a contact angle between a peripheral surface of the liquid in the reservoir and the electrowetting surface.

Example 15. The liquid lens array of any one of examples 1-14, wherein the plurality of independently operable array sections includes at least two overlapping array sections.

Example 16. A display device including (1) a light-emitting region that emits light from a plurality of sub-pixel regions, (2) a liquid lens array overlapping the light-emitting region, the lens array including a plurality of independently operable array sections, each of the plurality of array sections including (i) a transparent base layer, (ii) an aperture plate overlapping the transparent base layer, the aperture plate defining a plurality of apertures extending through the aperture plate between an inner surface of the aperture plate facing the transparent base layer and an outer surface of the aperture plate, and (iii) a liquid reservoir disposed between the base layer and the aperture plate, and (3) a driving circuit for operating at least one array section of the plurality of array sections to change liquid volumes extending from the liquid reservoir at least partially through the apertures defined in the aperture plate of the at least one array section.

Example 17. The display device of example 16, wherein each of the plurality of sub-pixel regions emits light that passes through one of the plurality of apertures.

Example 18. The display device of example 16 or example 17, wherein changing the liquid volumes extending from the liquid reservoir at least partially through the apertures changes the focal length of light emitted from the light-emitting region and passing through the apertures.

Example 19. A method including operating at least one array section of a plurality of independently operable array sections of a liquid lens array, each of the plurality of array sections including (1) a transparent base layer, (2) an aperture plate overlapping the transparent base layer, the aperture plate defining a plurality of apertures extending through the aperture plate between an inner surface of the aperture plate facing the transparent base layer and an outer surface of the aperture plate, and (3) a liquid reservoir disposed between the base layer and the aperture plate, wherein operating the at least one array section causes a change in liquid volumes extending from the liquid reservoir at least partially through the apertures defined in the aperture plate of the at least one array section.

Example 20. The method of example 19, wherein operating the at least one array section includes changing a pressure of a liquid in the liquid reservoir to change the liquid volumes extending from the liquid reservoir at least partially through the apertures defined in the aperture plate of the at least one array section.

Example 21. The method of example 19 or example 20, further including operating at least one additional array section of the plurality of array sections of the liquid lens array to cause a change in liquid volumes extending from the liquid reservoir at least partially through the apertures defined in the aperture plate of the at least one additional array section such that the liquid volumes of the at least one array section differ from the liquid volumes of the at least one additional array section.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1200 in FIG. 12) or that visually immerses a user in an artificial reality (such as, e.g., virtual-reality system 1300 in FIG. 13). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 12:
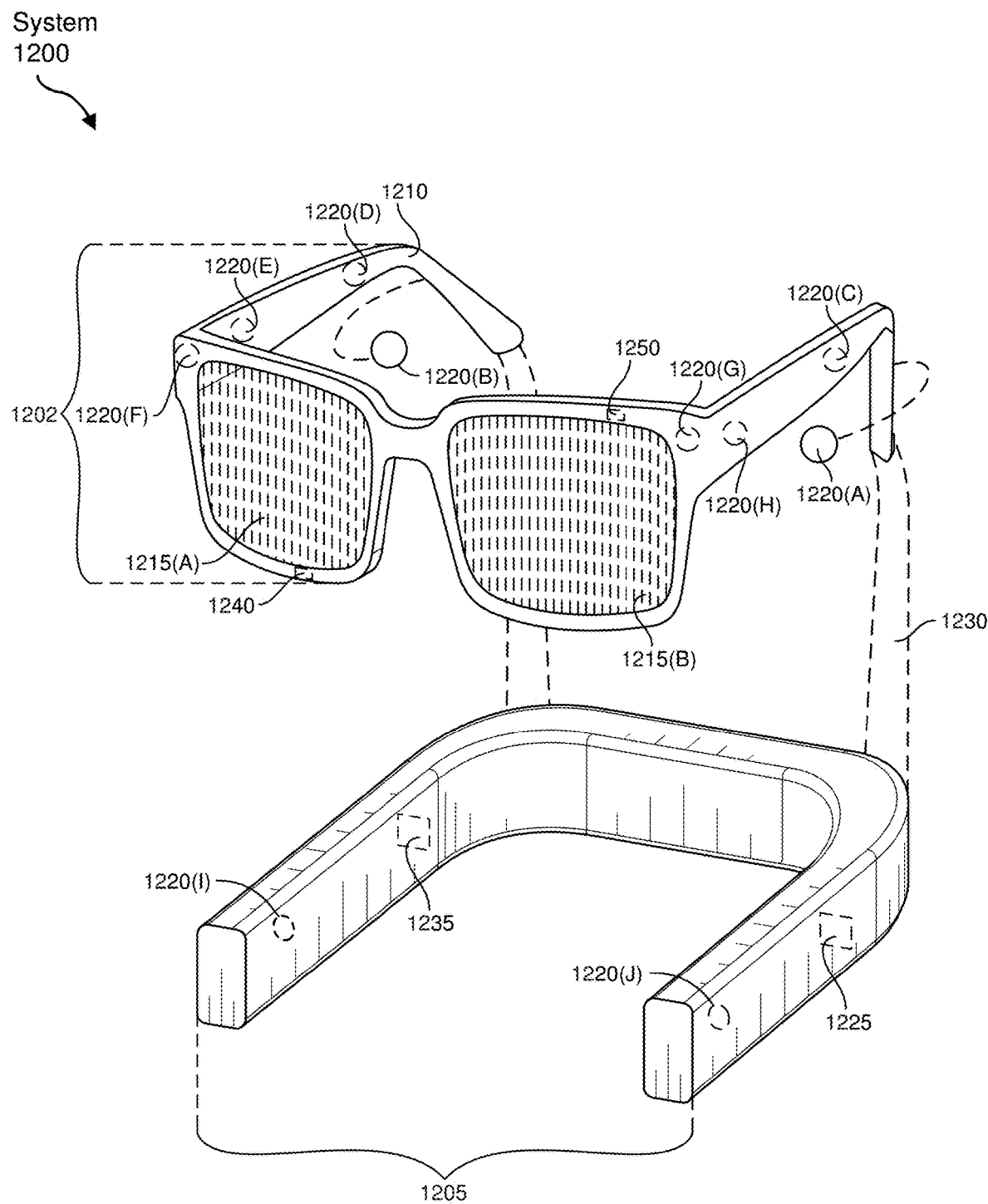
FIG. 12 is an illustration of exemplary augmented-reality glasses that may be used in connection with embodiments of this disclosure.
Figure 13:
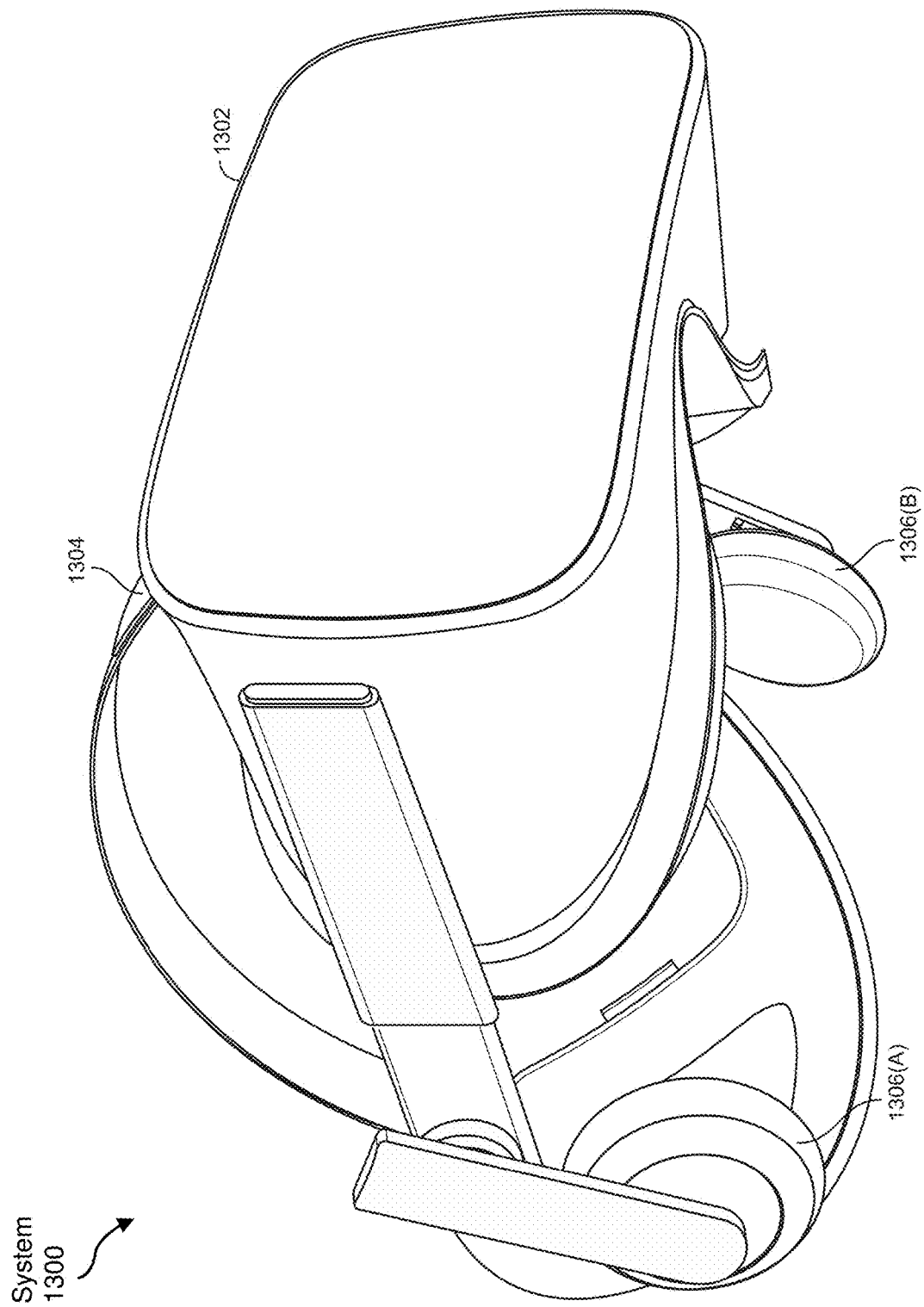
FIG. 13 is an illustration of an exemplary virtual-reality headset that may be used in connection with embodiments of this disclosure.

Turning to FIG. 12, augmented-reality system 1200 may include an eyewear device 1202 with a frame 1210 configured to hold a left display device 1215(A) and a right display device 1215(B) in front of a user's eyes. Display devices 1215(A) and 1215(B) may act together or independently to present an image or series of images to a user. While augmented-reality system 1200 includes two displays, embodiments of this disclosure may be implemented in augmented-reality systems with a single NED or more than two NEDs.

In some embodiments, augmented-reality system 1200 may include one or more sensors, such as sensor 1240. Sensor 1240 may generate measurement signals in response to motion of augmented-reality system 1200 and may be located on substantially any portion of frame 1210. Sensor 1240 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1200 may or may not include sensor 1240 or may include more than one sensor. In embodiments in which sensor 1240 includes an IMU, the IMU may generate calibration data based on measurement signals from sensor 1240. Examples of sensor 1240 may include, without limitation, accelerometers, gyroscopes, magnetometers, other suitable types of sensors that detect motion, sensors used for error correction of the IMU, or some combination thereof.

In some examples, augmented-reality system 1200 may also include a microphone array with a plurality of acoustic transducers 1220(A)-1220(J), referred to collectively as acoustic transducers 1220. Acoustic transducers 1220 may represent transducers that detect air pressure variations induced by sound waves. Each acoustic transducer 1220 may be configured to detect sound and convert the detected sound into an electronic format (e.g., an analog or digital format). The microphone array in FIG. 13 may include, for example, ten acoustic transducers: 1220(A) and 1220(B), which may be designed to be placed inside a corresponding ear of the user, acoustic transducers 1220(C), 1220(D), 1220(E), 1220(F), 1220(G), and 1220(H), which may be positioned at various locations on frame 1210, and/or acoustic transducers 1220(I) and 1220(J), which may be positioned on a corresponding neckband 1205.

In some embodiments, one or more of acoustic transducers 1220(A)-(F) may be used as output transducers (e.g., speakers). For example, acoustic transducers 1220(A) and/or 1220(B) may be earbuds or any other suitable type of headphone or speaker.

The configuration of acoustic transducers 1220 of the microphone array may vary. While augmented-reality system 1200 is shown in FIG. 12 as having ten acoustic transducers 1220, the number of acoustic transducers 1220 may be greater or less than ten. In some embodiments, using higher numbers of acoustic transducers 1220 may increase the amount of audio information collected and/or the sensitivity and accuracy of the audio information. In contrast, using a lower number of acoustic transducers 1220 may decrease the computing power required by an associated controller 1250 to process the collected audio information. In addition, the position of each acoustic transducer 1220 of the microphone array may vary. For example, the position of an acoustic transducer 1220 may include a defined position on the user, a defined coordinate on frame 1210, an orientation associated with each acoustic transducer 1220, or some combination thereof.

Acoustic transducers 1220(A) and 1220(B) may be positioned on different parts of the user's ear, such as behind the pinna, behind the tragus, and/or within the auricle or fossa. Or, there may be additional acoustic transducers 1220 on or surrounding the ear in addition to acoustic transducers 1220 inside the ear canal. Having an acoustic transducer 1220 positioned next to an ear canal of a user may enable the microphone array to collect information on how sounds arrive at the ear canal. By positioning at least two of acoustic transducers 1220 on either side of a user's head (e.g., as binaural microphones), augmented-reality device 1200 may simulate binaural hearing and capture a 3D stereo sound field around about a user's head. In some embodiments, acoustic transducers 1220(A) and 1220(B) may be connected to augmented-reality system 1200 via a wired connection 1230, and in other embodiments acoustic transducers 1220(A) and 1220(B) may be connected to augmented-reality system 1200 via a wireless connection (e.g., a Bluetooth connection). In still other embodiments, acoustic transducers 1220(A) and 1220(B) may not be used at all in conjunction with augmented-reality system 1200.

Acoustic transducers 1220 on frame 1210 may be positioned in a variety of different ways, including along the length of the temples, across the bridge, above or below display devices 1215(A) and 1215(B), or some combination thereof. Acoustic transducers 1220 may also be oriented such that the microphone array is able to detect sounds in a wide range of directions surrounding the user wearing the augmented-reality system 1200. In some embodiments, an optimization process may be performed during manufacturing of augmented-reality system 1200 to determine relative positioning of each acoustic transducer 1220 in the microphone array.

In some examples, augmented-reality system 1200 may include or be connected to an external device (e.g., a paired device), such as neckband 1205. Neckband 1205 generally represents any type or form of paired device. Thus, the following discussion of neckband 1205 may also apply to various other paired devices, such as charging cases, smart watches, smart phones, wrist bands, other wearable devices, hand-held controllers, tablet computers, laptop computers, other external compute devices, etc.

As shown, neckband 1205 may be coupled to eyewear device 1202 via one or more connectors. The connectors may be wired or wireless and may include electrical and/or non-electrical (e.g., structural) components. In some cases, eyewear device 1202 and neckband 1205 may operate independently without any wired or wireless connection between them. While FIG. 12 illustrates the components of eyewear device 1202 and neckband 1205 in example locations on eyewear device 1202 and neckband 1205, the components may be located elsewhere and/or distributed differently on eyewear device 1202 and/or neckband 1205. In some embodiments, the components of eyewear device 1202 and neckband 1205 may be located on one or more additional peripheral devices paired with eyewear device 1202, neckband 1205, or some combination thereof.

Pairing external devices, such as neckband 1205, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1200 may be provided by a paired device or shared between a paired device and an eyewear device, thus reducing the weight, heat profile, and form factor of the eyewear device overall while still retaining desired functionality. For example, neckband 1205 may allow components that would otherwise be included on an eyewear device to be included in neckband 1205 since users may tolerate a heavier weight load on their shoulders than they would tolerate on their heads. Neckband 1205 may also have a larger surface area over which to diffuse and disperse heat to the ambient environment. Thus, neckband 1205 may allow for greater battery and computation capacity than might otherwise have been possible on a stand-alone eyewear device. Since weight carried in neckband 1205 may be less invasive to a user than weight carried in eyewear device 1202, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1205 may be communicatively coupled with eyewear device 1202 and/or to other devices. These other devices may provide certain functions (e.g., tracking, localizing, depth mapping, processing, storage, etc.) to augmented-reality system 1200. In the embodiment of FIG. 12, neckband 1205 may include two acoustic transducers (e.g., 1220(1) and 1220(J)) that are part of the microphone array (or potentially form their own microphone subarray). Neckband 1205 may also include a controller 1225 and a power source 1235.

Acoustic transducers 1220(1) and 1220(J) of neckband 1205 may be configured to detect sound and convert the detected sound into an electronic format (analog or digital). In the embodiment of FIG. 12, acoustic transducers 1220(1) and 1220(J) may be positioned on neckband 1205, thereby increasing the distance between the neckband acoustic transducers 1220(1) and 1220(J) and other acoustic transducers 1220 positioned on eyewear device 1202. In some cases, increasing the distance between acoustic transducers 1220 of the microphone array may improve the accuracy of beamforming performed via the microphone array. For example, if a sound is detected by acoustic transducers 1220(C) and 1220(D) and the distance between acoustic transducers 1220(C) and 1220(D) is greater than, e.g., the distance between acoustic transducers 1220(D) and 1220(E), the determined source location of the detected sound may be more accurate than if the sound had been detected by acoustic transducers 1220(D) and 1220(E).

Controller 1225 of neckband 1205 may process information generated by the sensors on neckband 1205 and/or augmented-reality system 1200. For example, controller 1225 may process information from the microphone array that describes sounds detected by the microphone array. For each detected sound, controller 1225 may perform a direction-of-arrival (DOA) estimation to estimate a direction from which the detected sound arrived at the microphone array. As the microphone array detects sounds, controller 1225 may populate an audio data set with the information. In embodiments in which augmented-reality system 1200 includes an inertial measurement unit, controller 1225 may compute all inertial and spatial calculations from the IMU located on eyewear device 1202. A connector may convey information between augmented-reality system 1200 and neckband 1205 and between augmented-reality system 1200 and controller 1225. The information may be in the form of optical data, electrical data, wireless data, or any other transmittable data form. Moving the processing of information generated by augmented-reality system 1200 to neckband 1205 may reduce weight and heat in eyewear device 1202, making it more comfortable to the user.

Power source 1235 in neckband 1205 may provide power to eyewear device 1202 and/or to neckband 1205. Power source 1235 may include, without limitation, lithium ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1300 in FIG. 13, that mostly or completely covers a user's field of view. Virtual-reality system 1300 may include a front rigid body 1302 and a band 1304 shaped to fit around a user's head. Virtual-reality system 1300 may also include output audio transducers 1306(A) and 1306(B). Furthermore, while not shown in FIG. 13, front rigid body 1302 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1200 and/or virtual-reality system 1300 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 1200 and/or virtual-reality system 1300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1200 and/or virtual-reality system 1300 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 14:
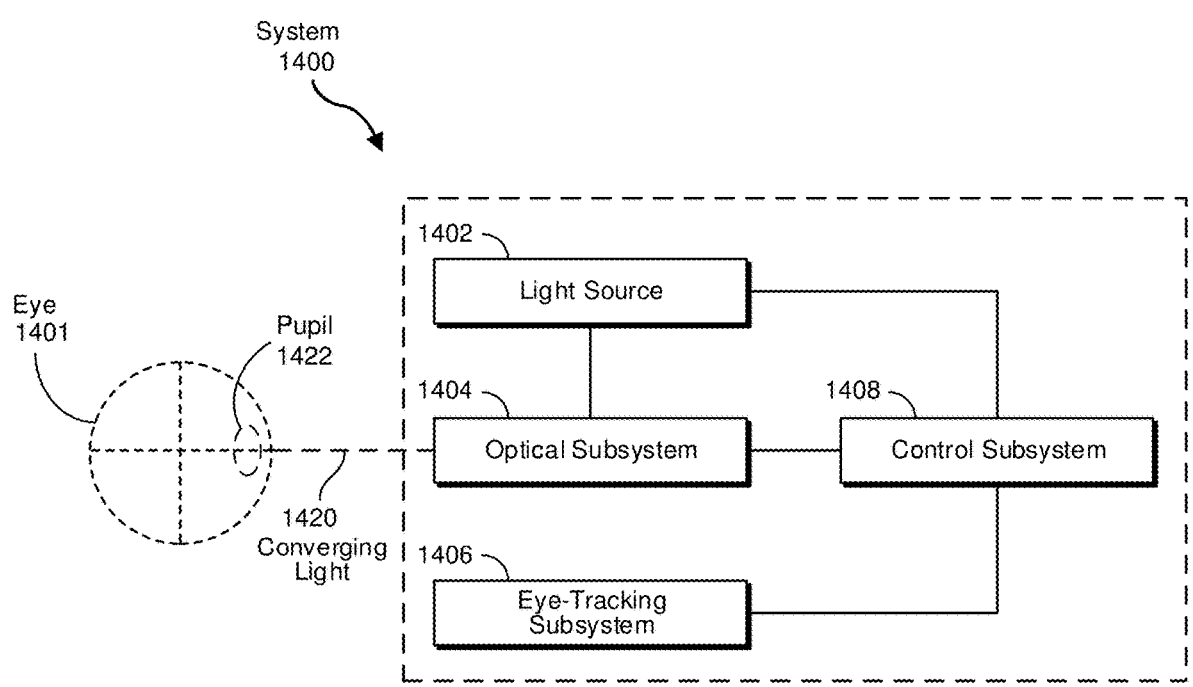
FIG. 14 an illustration of an exemplary system that incorporates an eye-tracking subsystem capable of tracking a user's eye(s).

FIG. 14 is an illustration of an exemplary system 1400 that incorporates an eye-tracking subsystem capable of tracking a user's eye(s). As depicted in FIG. 14, system 1400 may include a light source 1402, an optical subsystem 1404, an eye-tracking subsystem 1406, and/or a control subsystem 1408. In some examples, light source 1402 may generate light for an image (e.g., to be presented to an eye 1401 of the viewer). Light source 1402 may represent any of a variety of suitable devices. For example, light source 1402 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 1404 may receive the light generated by light source 1402 and generate, based on the received light, converging light 1420 that includes the image. In some examples, optical subsystem 1404 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1420. Further, various mechanical couplings may serve to maintain the relative spacing and/or the orientation of the optical components in any suitable combination.

In one embodiment, eye-tracking subsystem 1406 may generate tracking information indicating a gaze angle of an eye 1401 of the viewer. In this embodiment, control subsystem 1408 may control aspects of optical subsystem 1404 (e.g., the angle of incidence of converging light 1420) based at least in part on this tracking information. Additionally, in some examples, control subsystem 1408 may store and utilize historical tracking information (e.g., a history of the tracking information over a given duration, such as the previous second or fraction thereof) to anticipate the gaze angle of eye 1401 (e.g., an angle between the visual axis and the anatomical axis of eye 1401). In some embodiments, eye-tracking subsystem 1406 may detect radiation emanating from some portion of eye 1401 (e.g., the cornea, the iris, the pupil, or the like) to determine the current gaze angle of eye 1401. In other examples, eye-tracking subsystem 1406 may employ a wavefront sensor to track the current location of the pupil.

Any number of techniques can be used to track eye 1401. Some techniques may involve illuminating eye 1401 with infrared light and measuring reflections with at least one optical sensor that is tuned to be sensitive to the infrared light. Information about how the infrared light is reflected from eye 1401 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 1406 may be digitized (i.e., converted to an electronic signal). Further, the sensor may transmit a digital representation of this electronic signal to one or more processors (for example, processors associated with a device including eye-tracking subsystem 1406). Eye-tracking subsystem 1406 may include any of a variety of sensors in a variety of different configurations. For example, eye-tracking subsystem 1406 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1406 to track the movement of eye 1401. In another example, these processors may track the movements of eye 1401 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1406 may be programmed to use an output of the sensor(s) to track movement of eye 1401. In some embodiments, eye-tracking subsystem 1406 may analyze the digital representation generated by the sensors to extract eye rotation information from changes in reflections. In one embodiment, eye-tracking subsystem 1406 may use corneal reflections or glints (also known as Purkinje images) and/or the center of the eye's pupil 1422 as features to track over time.

In some embodiments, eye-tracking subsystem 1406 may use the center of the eye's pupil 1422 and infrared or near-infrared, non-collimated light to create corneal reflections. In these embodiments, eye-tracking subsystem 1406 may use the vector between the center of the eye's pupil 1422 and the corneal reflections to compute the gaze direction of eye 1401. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1406 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 1401 may act as a retroreflector as the light reflects off the retina, thereby creating a bright pupil effect similar to a red-eye effect in photography. If the illumination source is offset from the optical path, then the eye's pupil 1422 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1408 may control light source 1402 and/or optical subsystem 1404 to reduce optical aberrations (e.g., chromatic aberrations and/or monochromatic aberrations) of the image that may be caused by or influenced by eye 1401. In some examples, as mentioned above, control subsystem 1408 may use the tracking information from eye-tracking subsystem 1406 to perform such control. For example, in controlling light source 1402, control subsystem 1408 may alter the light generated by light source 1402 (e.g., by way of image rendering) to modify (e.g., pre-distort) the image so that the aberration of the image caused by eye 1401 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

FIG. 15 is a more detailed illustration of various aspects of the eye-tracking subsystem illustrated in FIG. 14. As shown in this figure, an eye-tracking subsystem 1500 may include at least one source 1504 and at least one sensor 1506. Source 1504 generally represents any type or form of element capable of emitting radiation. In one example, source 1504 may generate visible, infrared, and/or near-infrared radiation. In some examples, source 1504 may radiate non-collimated infrared and/or near-infrared portions of the electromagnetic spectrum towards an eye 1502 of a user. Source 1504 may utilize a variety of sampling rates and speeds. For example, the disclosed systems may use sources with higher sampling rates in order to capture fixational eye movements of a user's eye 1502 and/or to correctly measure saccade dynamics of the user's eye 1502. As noted above, any type or form of eye-tracking technique may be used to track the user's eye 1502, including optical-based eye-tracking techniques, ultrasound-based eye-tracking techniques, etc.

Sensor 1506 generally represents any type or form of element capable of detecting radiation, such as radiation reflected off the user's eye 1502. Examples of sensor 1506 include, without limitation, a charge coupled device (CCD), a photodiode array, a complementary metal-oxide-semiconductor (CMOS) based sensor device, and/or the like. In one example, sensor 1506 may represent a sensor having predetermined parameters, including, but not limited to, a dynamic resolution range, linearity, and/or other characteristic selected and/or designed specifically for eye tracking.

As detailed above, eye-tracking subsystem 1500 may generate one or more glints. As detailed above, a glint 1503 may represent reflections of radiation (e.g., infrared radiation from an infrared source, such as source 1504) from the structure of the user's eye. In various embodiments, glint 1503 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 15 shows an example image 1505 captured by an eye-tracking subsystem, such as eye-tracking subsystem 1500. In this example, image 1505 may include both the user's pupil 1508 and a glint 1510 near the same. In some examples, pupil 1508 and/or glint 1510 may be identified using an artificial-intelligence-based algorithm, such as a computer-vision-based algorithm. In one embodiment, image 1505 may represent a single frame in a series of frames that may be analyzed continuously in order to track the eye 1502 of the user. Further, pupil 1508 and/or glint 1510 may be tracked over a period of time to determine a user's gaze.

In one example, eye-tracking subsystem 1500 may be configured to identify and measure the inter-pupillary distance (IPD) of a user. In some embodiments, eye-tracking subsystem 1500 may measure and/or calculate the IPD of the user while the user is wearing the artificial reality system. In these embodiments, eye-tracking subsystem 1500 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's interpupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1400 and/or eye-tracking subsystem 1500 may be incorporated into augmented-reality system 1200 in FIG. 12 and/or virtual-reality system 1300 in FIG. 13 to enable these systems to perform various eye-tracking tasks (including one or more of the eye-tracking operations described herein).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive [data] to be transformed, transform the [data], output a result of the transformation to [perform a function], use the result of the transformation to [perform a function], and store the result of the transformation to [perform a function]. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A liquid lens array comprising:
   a plurality of independently operable array sections, each of the plurality of array sections comprising:
     a transparent base layer;
     an aperture plate overlapping the transparent base layer, the aperture plate defining a plurality of apertures extending through the aperture plate between an inner surface of the aperture plate facing the transparent base layer and an outer surface of the aperture plate; and
     a liquid reservoir disposed between the base layer and the aperture plate; and
   a driving circuit for operating at least one array section of the plurality of array sections to change liquid volumes extending from the liquid reservoir at least partially through the apertures defined in the aperture plate of the at least one array section.

2. The liquid lens array of claim 1, wherein each of the plurality of array sections are aligned with each other along a plane parallel to the outer surface of the aperture plate.

3. The liquid lens array of claim 1, wherein the liquid reservoirs of each of the plurality of array sections are partitioned from each other.

4. The liquid lens array of claim 1, wherein the liquid volumes extending from the liquid reservoir at least partially through the apertures defined in the aperture plate of the at least one array section are changed by changing a pressure of a liquid in the liquid reservoir.

5. The liquid lens array of claim 1, wherein:
   the liquid volumes extending from the liquid reservoir at least partially through the apertures defined in the aperture plate of the at least one array section are correlated to surface shapes of lens surfaces located at the apertures; and
   changing the liquid volumes extending from the liquid reservoir at least partially through the apertures changes the lens surface shapes of the lens surfaces.

6. The liquid lens array of claim 1, wherein the liquid volume extending at least partially through each aperture defined in the aperture plates forms a convex meniscus that acts as a lens surface.

7. The liquid lens array of claim 6, wherein increasing the liquid volumes extending at least partially through each aperture defined in the aperture plates decreases a radius of curvature of the convex meniscus.

8. The liquid lens array of claim 1, wherein each of the plurality of array sections further comprises an elastomeric layer disposed between the liquid reservoir and the aperture plate, the elastomeric layer overlapping the plurality of apertures.

9. The liquid lens array of claim 8, wherein the liquid volume extending at least partially through each aperture defined in the aperture plates forces an adjacent portion of the elastomeric layer at least partially through the aperture such that the adjacent portion of the elastomeric layer has a convex surface shape that acts as a lens surface.

10. The liquid lens array of claim 9, wherein increasing the liquid volume extending at least partially through each aperture defined in the aperture plates decreases a radius of curvature of the convex surface shape of the adjacent portion of the elastomeric layer.

11. The liquid lens array of claim 8, wherein:
the elastomeric layer comprises a dielectric elastomer; and
portions of the elastomeric layer overlapping the apertures are each disposed between a corresponding pair of electrodes.

12. The liquid lens array of claim 11, wherein the driving circuit operates an array section by applying a voltage difference between first electrodes and second electrodes of the pairs of electrodes in the array section.

13. The liquid lens array of claim 12, wherein increasing the voltage difference between the first electrode and the second electrode of a pair of electrodes produces an electrostatic force that compresses a portion of the elastomeric layer disposed between the first electrode and the second electrode so as to further force the portion of the elastomeric layer at least partially through a corresponding aperture while decreasing a radius of curvature of the portion of the elastomeric layer.

14. The liquid lens array of claim 1, wherein:
the transparent base layer comprises an electrowetting surface contacting the liquid reservoir; and
the driving circuit operates an array section by changing an electric field applied to the electrowetting surface to change a contact angle between a peripheral surface of the liquid in the reservoir and the electrowetting surface.

15. The liquid lens array of claim 1, wherein the plurality of independently operable array sections includes at least two overlapping array sections.

16. A display device comprising:
a light-emitting region that emits light from a plurality of sub-pixel regions;
a liquid lens array overlapping the light-emitting region, the lens array comprising a plurality of independently operable array sections, each of the plurality of array sections comprising:
a transparent base layer;
an aperture plate overlapping the transparent base layer, the aperture plate defining a plurality of apertures extending through the aperture plate between an inner surface of the aperture plate facing the transparent base layer and an outer surface of the aperture plate; and
a liquid reservoir disposed between the base layer and the aperture plate; and
a driving circuit for operating at least one array section of the plurality of array sections to change liquid volumes extending from the liquid reservoir at least partially through the apertures defined in the aperture plate of the at least one array section.

17. The display device of claim 16, wherein each of the plurality of sub-pixel regions emits light that passes through one of the plurality of apertures.

18. The display device of claim 16, wherein changing the liquid volumes extending from the liquid reservoir at least partially through the apertures changes a focal length of light emitted from the light-emitting region and passing through the apertures.

19. A method comprising:
operating at least one array section of a plurality of independently operable array sections of a liquid lens array, each of the plurality of array sections comprising:
a transparent base layer;
an aperture plate overlapping the transparent base layer, the aperture plate defining a plurality of apertures extending through the aperture plate between an inner surface of the aperture plate facing the transparent base layer and an outer surface of the aperture plate; and
a liquid reservoir disposed between the base layer and the aperture plate;
wherein operating the at least one array section causes a change in liquid volumes extending from the liquid reservoir at least partially through the apertures defined in the aperture plate of the at least one array section.

20. The method of claim 19, further comprising operating at least one additional array section of the plurality of array sections of the liquid lens array to cause a change in liquid volumes extending from the liquid reservoir at least partially through the apertures defined in the aperture plate of the at least one additional array section such that the liquid volumes of the at least one array section differ from the liquid volumes of the at least one additional array section.

* * * * *